US012634938B2

(12) United States Patent
    Gao et al.

(10) Patent No.: US 12,634,938 B2
(45) Date of Patent: May 19, 2026

(54) METHODS FOR COMMUNICATION, TERMINAL DEVICE, NETWORK DEVICE AND COMPUTER-READABLE MEDIA

(71) Applicant: NEC CORPORATION, Tokyo (JP)

(72) Inventors: Yukai Gao, Beijing (CN); Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 313 days.

(21) Appl. No.: 18/032,064

(22) PCT Filed: Oct. 16, 2020

(86) PCT No.: PCT/CN2020/121669
    § 371 (c)(1),
    (2) Date: Apr. 14, 2023

(87) PCT Pub. No.: WO2022/077491
    PCT Pub. Date: Apr. 21, 2022

(65) Prior Publication Data
    US 2024/0023101 A1     Jan. 18, 2024

(51) Int. Cl.
    *H04W 72/20*        (2023.01)
    *H04L 5/00*         (2006.01)

(52) U.S. Cl.
    CPC ........... *H04W 72/20* (2023.01); *H04L 5/0055* (2013.01)

(58) Field of Classification Search
    CPC .... H04W 72/20; H04L 5/0055; H04L 5/0023; H04L 5/0053
    See application file for complete search history.

(56) References Cited

U.S. PATENT DOCUMENTS

| | | | | |
|---|---|---|---|---|
| 12,245,244 B2 * | 3/2025 | Yu | .......................... | H04W 72/23 |
| 2019/0281587 A1 | 9/2019 | Zhang et al. | | |
| 2019/0313400 A1 | 10/2019 | Farag et al. | | |
| 2020/0236692 A1 * | 7/2020 | Lin | ..................... | H04W 72/535 |
| 2020/0314881 A1 | 10/2020 | Bagheri et al. | | |
| 2020/0322929 A1 * | 10/2020 | Bagheri | ................ | H04L 5/0053 |

(Continued)

FOREIGN PATENT DOCUMENTS

| | | |
|---|---|---|
| CN | 101873706 A | 10/2010 |
| CN | 102014491 A | 4/2011 |

(Continued)

OTHER PUBLICATIONS

CN Office Action for CN Application No. 202080106189.6, mailed on May 14, 2024 with English Translation.
Japanese Office Action for JP Application No. 2023-522974 mailed on Apr. 2, 2024 with English Translation.
Huawei, HiSilicon, Corrections on cross-carrier scheduling with different numerology, 3GPP TSG RAN WG1 #100_e R1-2001035, Feb. 15, 2020.

(Continued)

*Primary Examiner* — Schquita D Goodwin
(74) *Attorney, Agent, or Firm* — Sughrue Mion, PLLC

(57) ABSTRACT

Embodiments of the present disclosure relate to methods for communication, terminal devices, network devices and computer readable media. In the method, a terminal device determines a transmission configuration indicator (TCI) state for a physical downlink control channel (PDCCH) candidate, based on at least one of: an index of the PDCCH candidate, and an index of a control channel element (CCE) of the PDCCH candidate. The terminal device monitors the PDCCH candidate based on the TCI state. As a result, the complexity of the terminal device for blind detection or decoding is able to be reduced.

15 Claims, 5 Drawing Sheets

(56) References Cited

U.S. PATENT DOCUMENTS

| | | | | |
|---|---|---|---|---|
| 2021/0029726 A1* | 1/2021 | Papasakellariou | .... | H04W 72/21 |
| 2021/0099255 A1* | 4/2021 | Gao | ...................... | H04L 1/1854 |
| 2021/0143943 A1* | 5/2021 | Zhou | ................ | H04W 72/0453 |
| 2021/0195600 A1* | 6/2021 | Khoshnevisan | ...... | H04W 72/53 |
| 2022/0070900 A1* | 3/2022 | Yin | ........................ | H04L 1/0003 |
| 2022/0191832 A1* | 6/2022 | Yokomakura | ......... | H04W 72/23 |
| 2022/0408458 A1* | 12/2022 | MolavianJazi | ... | H04W 72/1263 |
| 2024/0073887 A1* | 2/2024 | Bae | .................... | H04W 72/535 |

FOREIGN PATENT DOCUMENTS

| | | |
|---|---|---|
| CN | 110391881 A | 10/2019 |
| CN | 111130708 A | 5/2020 |
| CN | 111431685 A | 7/2020 |
| WO | 2019/139955 A1 | 7/2019 |
| WO | 2019/244222 A1 | 12/2019 |
| WO | 2020/021720 A1 | 1/2020 |
| WO | 2020/093016 A1 | 5/2020 |

OTHER PUBLICATIONS

NTT Docomo, Inc., Maintenance for physical uplink control channel, 3GPP TSG RAN WG1 #94 R1-1809142, Aug. 11, 2018.

Extended European Search Report for EP Application No. 20957269. 2, dated on Mar. 11, 2024.

Qualcomm Incorporated, "Remaining issues for resource allocation for PUCCH", 3GPP TSG RAN WG1 Meeting #92, R1-1802840, Feb. 26-Mar. 2, 2018, pp. 1-9.

ZTE, Sanechips, "Remaining issues for PUCCH resource allocation", 3GPP TSG RAN WG1 Meeting #92, R1-1801628, Feb. 26-Mar. 2, 2018, pp. 1-4.

JP Office Action for JP Application No. 2023-522974, mailed on Sep. 17, 2024 with English Translation.

EP Official Communication for EP Application No. EP20957269.2 mailed on Dec. 8, 2023.

Written Opinion for PCT/CN2020/121669, dated Jul. 21, 2021.

International Search Report for PCT/CN2020/121669, dated Jul. 21, 2021.

* cited by examiner

100

200

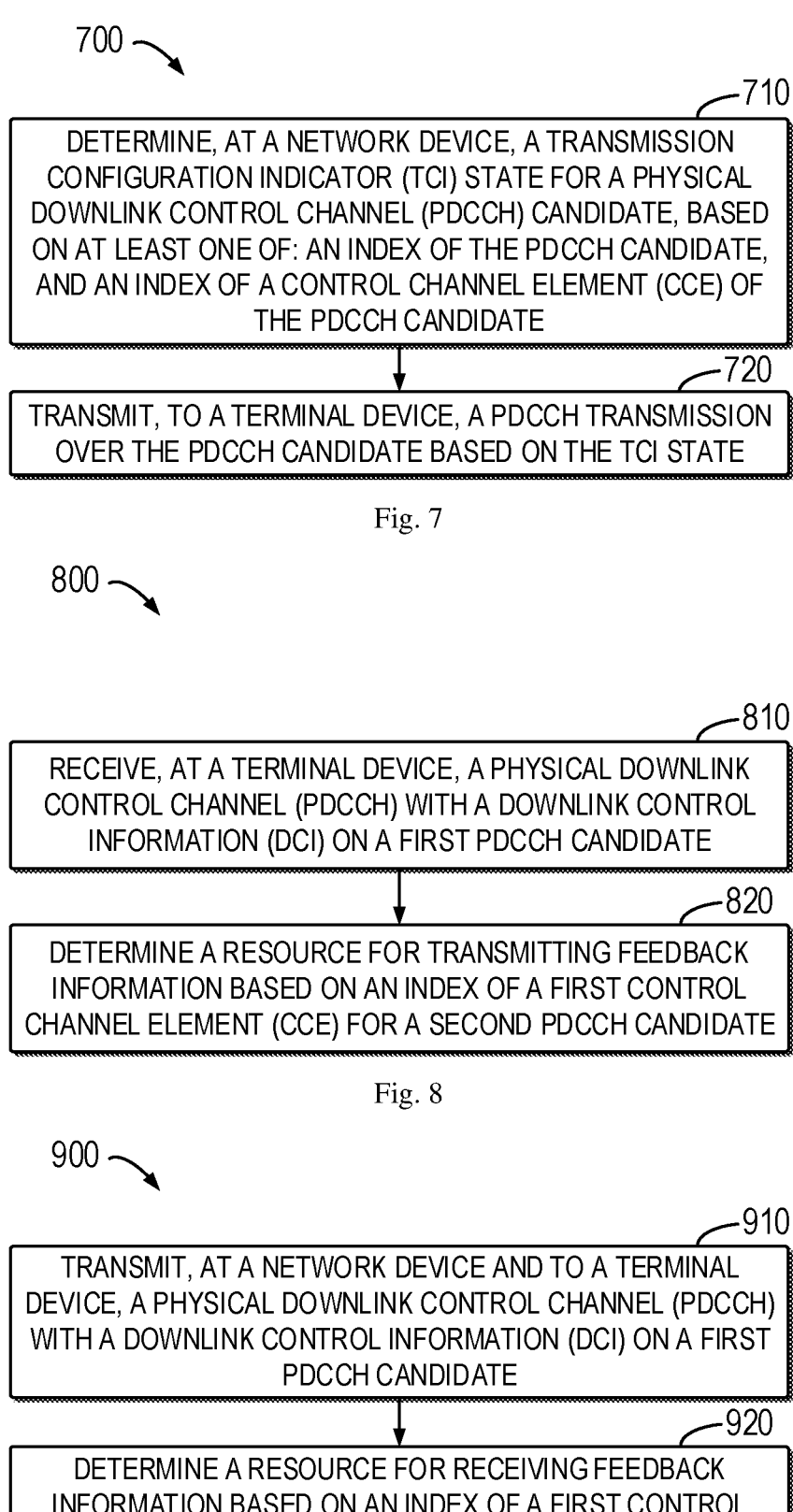

700

710

DETERMINE, AT A NETWORK DEVICE, A TRANSMISSION CONFIGURATION INDICATOR (TCI) STATE FOR A PHYSICAL DOWNLINK CONTROL CHANNEL (PDCCH) CANDIDATE, BASED ON AT LEAST ONE OF: AN INDEX OF THE PDCCH CANDIDATE, AND AN INDEX OF A CONTROL CHANNEL ELEMENT (CCE) OF THE PDCCH CANDIDATE

720

TRANSMIT, TO A TERMINAL DEVICE, A PDCCH TRANSMISSION OVER THE PDCCH CANDIDATE BASED ON THE TCI STATE

RECEIVE, AT A TERMINAL DEVICE, A PHYSICAL DOWNLINK CONTROL CHANNEL (PDCCH) WITH A DOWNLINK CONTROL INFORMATION (DCI) ON A FIRST PDCCH CANDIDATE

820

DETERMINE A RESOURCE FOR TRANSMITTING FEEDBACK INFORMATION BASED ON AN INDEX OF A FIRST CONTROL CHANNEL ELEMENT (CCE) FOR A SECOND PDCCH CANDIDATE

TRANSMIT, AT A NETWORK DEVICE AND TO A TERMINAL DEVICE, A PHYSICAL DOWNLINK CONTROL CHANNEL (PDCCH) WITH A DOWNLINK CONTROL INFORMATION (DCI) ON A FIRST PDCCH CANDIDATE

920

DETERMINE A RESOURCE FOR RECEIVING FEEDBACK INFORMATION BASED ON AN INDEX OF A FIRST CONTROL CHANNEL ELEMENT (CCE) FOR A SECOND PDCCH CANDIDATE

Fig. 9

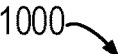

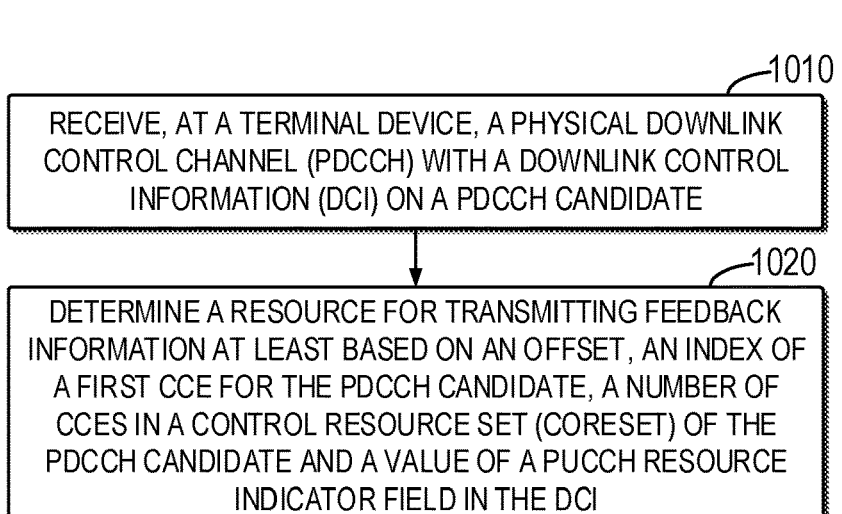

RECEIVE, AT A TERMINAL DEVICE, A PHYSICAL DOWNLINK CONTROL CHANNEL (PDCCH) WITH A DOWNLINK CONTROL INFORMATION (DCI) ON A PDCCH CANDIDATE ⟋1010

DETERMINE A RESOURCE FOR TRANSMITTING FEEDBACK INFORMATION AT LEAST BASED ON AN OFFSET, AN INDEX OF A FIRST CCE FOR THE PDCCH CANDIDATE, A NUMBER OF CCES IN A CONTROL RESOURCE SET (CORESET) OF THE PDCCH CANDIDATE AND A VALUE OF A PUCCH RESOURCE INDICATOR FIELD IN THE DCI ⟋1020

Fig. 10

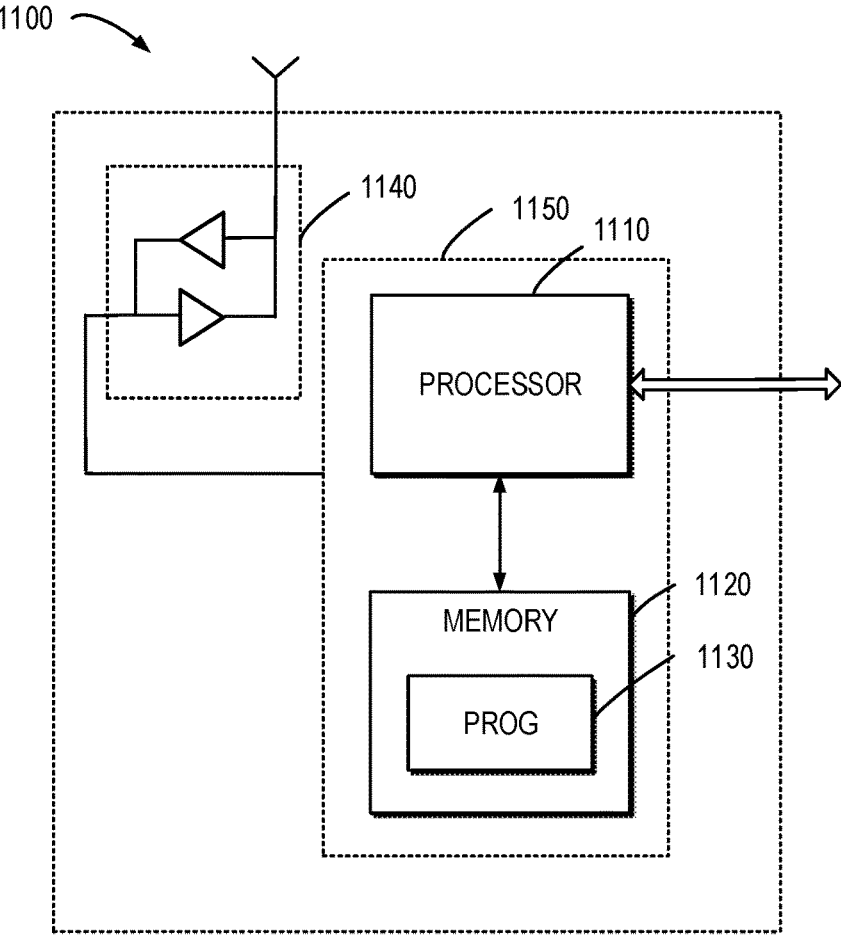

PROCESSOR 1110

MEMORY 1120

PROG 1130

METHODS FOR COMMUNICATION, TERMINAL DEVICE, NETWORK DEVICE AND COMPUTER-READABLE MEDIA

CROSS REFERENCE TO RELATED APPLICATIONS

This application is a National Stage of International Application No. PCT/CN2020/121669 filed Oct. 16, 2020.

TECHNICAL FIELD

Embodiments of the present disclosure generally relate to the field of telecommunication, and in particular, to methods for communication, terminal devices, network devices and computer readable media.

BACKGROUND

In 3GPP meeting, enhancements on the support for multi-transmission and reception point (multi-TRP) deployment have been discussed. For example, it has been proposed to identify and specify features to improve reliability and robustness for physical channels (such as, a physical downlink control channel (PDCCH), a physical uplink shared channel (PUSCH) and/or a physical uplink control channel (PUCCH)) other than a physical downlink shared channel (PDSCH) using multi-TRP and/or multi-panel with Release 16 reliability features as a baseline. It has also been proposed to identify and specify features to enable inter-cell multi-TRP operations. It has also been proposed to evaluate and specify enhancements for simultaneous multi-TRP transmissions with multi-panel receptions.

Further, in 3GPP meeting, it has also been proposed to support PDCCH repetitions to improve reliability and robustness for the PDCCH. That is, downlink control information (DCI) can be repeatedly transmitted from a network device to a terminal device more than once, so as to improve reliability and robustness for the PDCCH.

SUMMARY

In general, example embodiments of the present disclosure provide a solution for reliability and robustness.

In a first aspect, there is provided a method of communication. The method comprises: determining, at a terminal device, a transmission configuration indicator (TCI) state for a physical downlink control channel (PDCCH) candidate, based on at least one of: an index of the PDCCH candidate, and an index of a control channel element (CCE) of the PDCCH candidate; and monitoring the PDCCH candidate based on the TCI state.

In a second aspect, there is provided a method of communication. The method comprises: determining, at a network device, a transmission configuration indicator (TCI) state for a physical downlink control channel (PDCCH) candidate, based on at least one of: an index of the PDCCH candidate, and an index of a control channel element (CCE) of the PDCCH candidate; and transmitting, to a terminal device, a PDCCH transmission over the PDCCH candidate based on the TCI state.

In a third aspect, there is provided a method of communication. The method comprises: receiving, at a terminal device, a physical downlink control channel (PDCCH) with downlink control information (DCI) on a first PDCCH candidate; and determining a resource for transmitting feedback information based on an index of a first control channel element (CCE) for a second PDCCH candidate.

In a fourth aspect, there is provided a method of communication. The method comprises: transmitting, at a network device and to a terminal device, a physical downlink control channel (PDCCH) with downlink control information (DCI) on a first PDCCH candidate; and determining a resource for receiving feedback information based on an index of a first control channel element (CCE) for a second PDCCH candidate.

In a fifth aspect, there is provided a method of communication. The method comprises: receiving, at a terminal device, a physical downlink control channel (PDCCH) with downlink control information (DCI) on a PDCCH candidate; and determining a resource for transmitting feedback information at least based on an offset, an index of a first CCE for the PDCCH candidate, a number of CCEs in a control resource set (CORESET) of the PDCCH candidate and a value of a PUCCH resource indicator field in the DCI.

In a sixth aspect, there is provided a terminal device. The terminal device includes a processor; and a memory coupled to the processor and storing instructions thereon, the instructions, when executed by the processor, causing the terminal device to perform the method according to the first aspect, the third aspect, or the fifth aspect.

In a seventh aspect, there is provided a network device. The network device includes: a processor; and a memory coupled to the processor and storing instructions thereon, the instructions, when executed by the processor, causing the network device to perform the method according to the second aspect, or the fourth aspect.

In an eight aspect, there is provided a computer-readable medium having instructions stored thereon, the instructions, when executed on at least one processor, causing the at least one processor to carry out the method according to the first aspect, the third aspect, or the fifth aspect.

In a ninth aspect, there is provided a computer-readable medium having instructions stored thereon, the instructions, when executed on at least one processor, causing the at least one processor to carry out the method according to the second aspect, or the fourth aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIG. 7 illustrates a flowchart of a method of communication in accordance with some example embodiments of the present disclosure;

FIG. 8 illustrates a flowchart of a method of communication in accordance with some example embodiments of the present disclosure;

FIG. 9 illustrates a flowchart of a method of communication in accordance with some example embodiments of the present disclosure;

FIG. 10 illustrates a flowchart of a method of communication in accordance with some example embodiments of the present disclosure; and FIG. 11 is a simplified block diagram of a device that is suitable for implementing embodiments of the present disclosure.

Throughout the drawings, the same or similar reference numerals represent the same or similar element.

DETAILED DESCRIPTION

Figure 1:
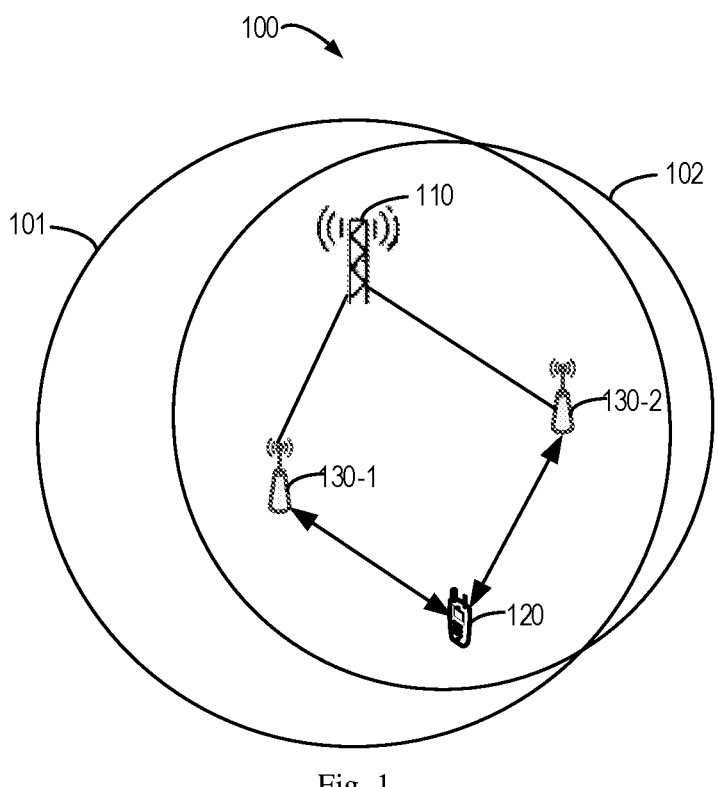
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In the following, the terms "transmission occasion", "transmission", "repetition", "reception", "reception occasion", "monitoring occasion", "PDCCH monitoring occasion", "PDCCH transmission occasion", "PDCCH transmission", "PDCCH candidate", "PDCCH reception occasion", "PDCCH reception", "search space", "CORESET", "multi-chance" and "PDCCH repetition" can be used interchangeably. The terms "position of the feedback", "HARQ-ACK information location", "HARQ-ACK position", "HARQ-ACK location", "HARQ position", "HARQ location", "feedback position" and "feedback location" can be used interchangeably. In the following, the terms "PDCCH repetitions", "repeated PDCCHs" and "repeated PDCCH signals", "PDCCH candidates configured for same scheduling" can be used interchangeably. The terms "HARQ-ACK information", "HARQ-ACK message", "HARQ message", "HARQ information", "feedback message" and "feedback information" can be used interchangeably. The terms "HARQ-ACK information field", "HARQ-ACK information location", "feedback field" and "feedback location" can be used interchangeably. The terms "DCI" and "DCI format" can be used interchangeably. The terms "TCI state", "Quasi-co-location (QCL)", "set of QCL parameter(s)", "QCL parameter(s)", "QCL assumption" and "QCL configuration" can be used interchangeably.

As described above, in order to improve reliability and robustness for physical channels such as PDCCH, it was proposed to support physical channel repetition. For example, DCI is repeatedly transmitted from a network device to a terminal device more than once, to improve reliability and robustness for the PDCCH.

A control-resource set (i.e. CORESET) may consist of $N_{RB}^{CORESET}$ resource blocks (RBs) in the frequency domain and $N_{symb}^{CORESET} \in \{1,2,3\}$ symbols in the time domain. In some embodiments, a control-channel element (CCE) consists of 6 resource-element groups (REGs) where a REG equals to one resource block during one orthogonal frequency-division multiplexing (OFDM) symbol. In some embodiments, REGs within a control-resource set are numbered in increasing order in a time-first manner, starting with 0 for the first OFDM symbol and the lowest-numbered resource block in the control resource set.

Further, one CORESET may be associated with one or more search space sets. One search space set may include or may be associated with one or more PDCCH candidates. PDCCH monitoring periodicity and/or slot offset and/or symbol index within a slot can be configured per search space set. One CORESET and/or one search space set may include a plurality of CCEs. For example the number of plurality of CCEs is $N_{CCE}$, and $N_{CCE}$ is positive integer. For example, $1 < N_{CCE} \leq 45$. For another example, $1 \leq N_{CCE} \leq 46$. And each CCE in the plurality of CCEs has an index numbered, for example, from 0 to $N_{CCE}$-1. For example, one PDCCH candidate may correspond to a search space.

A PDCCH channel may consist of one or more control channel elements (CCEs). The supported PDCCH aggregation levels may be 1, 2, 4, 8, and 16. When the aggregation level is 1, the PDCCH channel consists of 1 CCE. When the aggregation level is 4, the PDCCH channel consists of 4 CCEs. When the aggregation level is 16, the PDCCH channel consists of 16 CCEs.

In some embodiments, a terminal device (e.g., a user equipment (UE)) may be configured with multiple control-resource sets (i.e. CORESET). Each control-resource set is associated with one CCE-to-REG mapping only.

In some embodiments, a procedure is defined for determining physical downlink control channel candidates for a terminal device. That is, determining the CCE index(es) for each of a plurality of PDCCH candidates that is potentially to be used for PDCCH transmission between the network device and the terminal device. With the CCE index for PDCCH candidates determined, the terminal device can perform blind detection on these PDCCH candidates. Once PDCCH transmission is detected or received on a PDCCH candidate, the terminal device could decode it to obtain information such as DCI.

A terminal device may assume that a DM-RS antenna port associated with PDCCH reception(s) in the CORESET is quasi co-located (QCLed) with the one or more reference signal (RS) configured by a TCI state, where the TCI state is indicated for the CORESET, if any.

A terminal device may assume that a DM-RS antenna port associated with PDCCH reception(s) in the CORESET is quasi co-located (QCLed) with a Synchronization Signal/ Physical Broadcast Channel (SS/PBCH) block the UE identified during a most recent random access procedure not initiated by a PDCCH order that triggers a contention-free random access procedure, if no MAC CE activation command indicating a TCI state for the CORESET is received after the most recent random access procedure the one or more reference signal (RS) configured by a TCI state, where the TCI state is indicated for the CORESET, if any.

Meanwhile, for PDCCH reliability enhancement with multiple TRPs, in one solution, encoding or rate matching for a PDCCH is based on one repetition, and the same coded bits are repeated for the other repetition. Each repetition may have the same number of CCEs and coded bits, and corresponds to the same DCI payload. Alternatively, separate DCIs schedule the same PDSCH/PUSCH, and the number of CCEs for scheduling the same PDSCH/PUSCH may be different. In such alternative, a terminal device may know the separate DCIs are used for scheduling the same PDSCH/ PUSCH after decoding the DCIs.

However, when multi-TRP is used for PDCCH transmission, multiple TCI states may be configured for the multiple TRPs to indicate, for example, downlink Rx beams for the terminal device, etc. Accordingly, the inventors of the present application noticed that for linked/associated PDCCH candidates used for repeated PDCCH, there is no solution for determining TCI state for each PDCCH candidates.

Furthermore, the inventor of the present application noticed that for more than one PDCCH candidates that schedules same PDSCH reception or same Semi-persistent scheduling (SPS) PDSCH release (i.e. for PDCCH used for PDCCH repetition or multi-chance PDCCH), there is no solution of how to design a CCE index for PUCCH resource for the repeated or multi-chance PDCCH.

FIG. 1 shows an example communication network 100 in which embodiments of the present disclosure can be implemented. The communication network 100 includes a network device 110 and a terminal device 120 served by the network device 110. The communication network 100 may provide one or more serving cells to serve the terminal device 120. Carrier aggregation (CA) can be supported in the communication network 100, in which two or more component carriers are aggregated in order to support a broader bandwidth. For example, in FIG. 1, the network device 110 may provide the terminal device 120 a plurality of serving cells including one primary cell (Pcell) 101 corresponding to a primary component carrier and at least one secondary cell (Scell) 102 corresponding to at least one secondary component carrier. It is to be understood that the number of network devices, terminal devices and/or serving cells is only for the purpose of illustration without suggesting any limitations to the present disclosure. The communication network 100 may include any suitable number of network devices, terminal devices and/or serving cells adapted for implementing implementations of the present disclosure.

As used herein, the term "terminal device" refers to any device having wireless or wired communication capabilities. Examples of the terminal device include, but is not limited to, a user equipment (UE), personal computers, desktops, mobile phones, cellular phones, smart phones, personal digital assistants (PDAs), portable computers, tablets, wearable devices, internet of things (IoT) devices, Internet of everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 120.

As used herein, the term 'network device' or 'base station' (BS) refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device 120 may be connected with a first network device and a second network device (not shown in FIG. 1). One of the first network device and the second network device may be in a master node and the other one may be in a secondary node. The first network device and the second network device may use different radio access technologies (RATs). In one embodiment, the first network device may be a first RAT device and the second network device may be a second RAT device. In one embodiment, the first RAT device may be an eNB and the second RAT device is a gNB. Information related to different RATs may be transmitted to the terminal device 120 from at least one of the first network device and the second network device. In one embodiment, first information may be transmitted to the terminal device 120 from the first network device and second information may be transmitted to the terminal device 120 from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device. The information may be transmitted via any of the following: radio resource control (RRC) signaling, medium access control (MAC) control element (CE) or downlink control information (DCI).

In the communication network 100 as shown in FIG. 1, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

In some embodiments, for downlink transmissions, the network device 110 may transmit control information via PDCCH and/or transmit data via PDSCH to the terminal device 120. Additionally, the network device 110 may transmit one or more reference signals (RSs) to the terminal device 120. The RS transmitted from the network device 110 to the terminal device 120 may also referred to as a "DL RS". Examples of the DL RS may include but are not limited to demodulation reference signal (DMRS), channel state information-reference signal (CSI-RS), sounding reference signal (SRS), phase tracking reference signal (PTRS), fine time and frequency tracking reference signal (TRS) and so on.

In some embodiments, for uplink transmissions, the terminal device 120 may transmit control information via a PUCCH and/or transmit data via a PUSCH to the network device 110. Additionally, the terminal device 120 may transmit one or more RSs to the network device 110. The RS transmitted from the terminal device 120 to the network device 110 may also referred to as a "UL RS". Examples of the UL RS may include, but are not limited to, DMRS, CSI-RS, SRS, PTRS, fine time and frequency TRS, and so on.

The communications in the communication network 100 may conform to any suitable standards including, but not limited to, global system for mobile communications (GSM), long term evolution (LTE), LTE-evolution, LTE-advanced (LTE-A), wideband code division multiple access (WCDMA), code division multiple access (CDMA), GSM EDGE radio access network (GERAN), machine type communication (MTC), and the like.

Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

The network device 110 (such as, a gNB) may be equipped with one or more TRPs or antenna panels. As used herein, the term "TRP" refers to an antenna array (with one or more antenna elements) available to the network device 110 located at a specific geographical location. For example, a network device 110 may be coupled with multiple TRPs in different geographical locations to achieve better coverage. The one or more TRPs may be included in a same serving cell or different serving cells.

It is to be understood that the TRP can also be a panel, and the panel can also refer to an antenna array (with one or more antenna elements). Although some embodiments of the present disclosure are described with reference to multiple TRPs for example, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

As shown in FIG. 1, for example, the network device 110 may communicate with the terminal device 120 via TRPs 130-1 and 130-2. In the following text, the TRP 130-1 may also be referred to as the first TRP, while the TRP 130-2 may be also referred to as the second TRP. The first and second TRPs 130-1 and 130-2 may be included in same serving cells (such as, the serving cells 101 and 102 as shown in FIG. 1) or different serving cells provided by the network device 110. Although some embodiments of the present disclosure are described with reference to the first and second TRPs 130-1 and 130-2 within same serving cells provided by the network device 110, these embodiments are only for the purpose of illustration and help those skilled in the art to understand and implement the present disclosure, without suggesting any limitations as to the scope of the present disclosure. It is to be understood that the present disclosure described herein can be implemented in various manners other than the ones described below.

As mentioned above, when multi-TRP is used for PDCCH transmission, multiple TCI states will be configured for the multiple TRPs to indicate, for example, downlink Rx beams for the terminal device.

In some embodiments, the network device 110 may transmit, to the terminal device 120, a configuration indicative of N PDCCH candidates, N is a positive integer. For example, $1 \leq N \leq 32$. For another example, $1 \leq N \leq 44$. For example, the configuration may be transmitted via any of Radio Resource Control (RRC) signaling, Medium Access Control (MAC) control element (CE) and DCI.

In some embodiments, the N PDCCH candidates may be comprised in one search space. In some embodiments, the search space may be associated with one control resource set (CORESET), which may be configured with two transmission configuration indication (TCI) states T1 and T2. For example, N1 PDCCH candidates (where N1 is an integer and $1 \leq N1 \leq N$) may be configured with TCI state T1 and (N-N1) PDCCH candidates may be configured with TCI state T2. Alternatively, in some embodiments, the search space may be associated with two CORESETs. For example, N1 PDCCH candidates (where N1 is an integer and $1 \leq N1 \leq N$) may be associated with a first CORESET and (N-N1) PDCCH candidates may be associated with a second CORESET. In some embodiments, the N1 PDCCH candidates may be represented as the second set of PDCCH candidates. In some embodiments, the N-N1 PDCCH candidates may be represented as the first set of PDCCH candidates.

In some examples, for PDCCH transmission/reception (for example, when two TRPs (e.g., TRP 130-1 and TRP 130-2) are used for transmission), one alternative is that one CORESET has two active TCI states. In another alternative, one search space set is associated with two different CORESETs. Alternatively, two search space sets are associated with respective CORESETs.

In particular, for the alternative in which one CORESET has two active TCI states, there are various options. In these options, a plurality of PDCCH candidates can be divided into two sets of PDCCH candidates and each set of PDCCH candidates include a single or multiple PDCCH candidates. A PDCCH candidate in a set corresponds to a repetition or chance. Specifically, in one option, one PDCCH candidate in a given search space set may be associated with both of the two active TCI states of the CORESET. In another option, PDCCH candidates in a given search space set are divided into two sets, and the two sets of PDCCH candidates are associated with the two TCI states of the CORESET, respectively. Alternatively, the two sets of PDCCH candidates are associated with two corresponding search space sets, where both service space sets are associated with the CORESET and each search space set is associated with only one TCI state of the CORESET.

Furthermore, two or more PDCCH candidates (for example, for respective repetitions or chances) may be explicitly linked together. That is, a terminal device is able to know the linking before decoding. Alternative, the two or more PDCCH candidates may not be explicitly link together. As such, the terminal device may need to know the linking after decoding.

Accordingly, the inventors of the present application noticed that for linked/associated PDCCH candidates, there is no solution for determining TCI state for a PDCCH candidate.

Accordingly, embodiments of the present disclosure provide a solution to solve the problems above and/or one or more of other potential problems. In this solution, the terminal device determines a transmission configuration indicator (TCI) state for a physical downlink control channel (PDCCH) candidate, based on at least one of: an index of the PDCCH candidate, or an index of a control channel element (CCE) of the PDCCH candidate. Then the terminal device monitoring the PDCCH candidate based on the TCI state. As such, for the multi-TRP scenario, TCI state is able to be determined for each PDCCH candidate.

Figure 2:
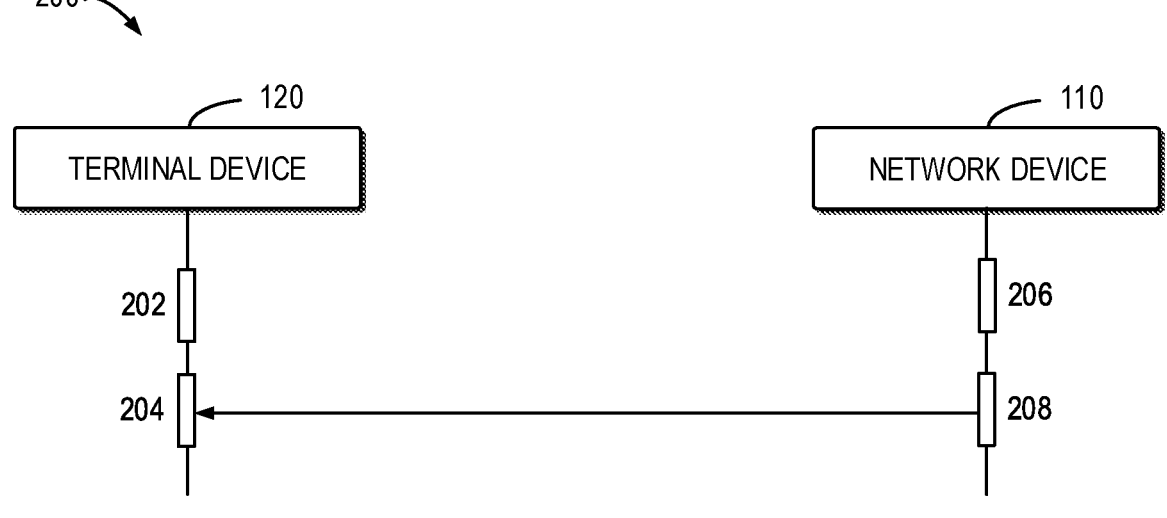
FIG. 2 is a signaling chart illustrating the process of determining a transmission configuration indicator (TCI) for a PDCCH candidate in accordance with some embodiments of the present disclosure.

Reference is now made to FIG. 2, which shows a signaling flow 200 for cell reselection during a SDT procedure in accordance with an embodiment of the present disclosure. For the purpose of discussion, the signaling flow 200 will be described with reference to FIG. 1. The signaling flow 200 may involve the network device 110, the terminal device 120 as illustrated in FIG. 1.

In the signalling flow 200, the terminal device 120 determines 202 a TCI state for a PDCCH candidate, based on the index of a PDCCH candidate for the terminal device 120. Alternatively, the terminal device 120 determines 202 the index of a CCE of the PDCCH candidate. In some embodiments, the PDCCH candidate may be one of a plurality PDCCH candidates for an aggregation level in a search space set.

Then, the terminal device 120 monitors 204 the PDCCH candidate based on the TCI state.

Meanwhile, the network device 110 determines 206 a TCI state for a PDCCH candidate, based on the index of a PDCCH candidate for the terminal device 120. Alternatively, the network device 110 determines 206 the index of a CCE of the PDCCH candidate. Upon determining the TCI state, the network device 110 transmits 208, to a terminal device, a PDCCH transmission over the PDCCH candidate based on the TCI state.

When the network device 110 transmits 206 a PDCCH transmission on a PDCCH candidate. Accordingly, the PDCCH transmission (e.g., DCI) is able to be detected at the terminal device side 120 as a result of the monitoring.

In the following part, a few methods of how to determine the TCI state will be described.

In some embodiments, specifically, the terminal device 120 may determine a first set of PDCCH candidates and a second set of PDCCH candidates from a plurality of PDCCH candidates based on indexes of the plurality of PDCCH candidates. Then, the terminal device 120 may determine, from the first set of PDCCH candidates and the second set of PDCCH candidates, a target set of PDCCH candidates to which the PDCCH candidate belongs based on the index of the PDCCH candidate. After that, the terminal device 120 may determine the TCI state corresponding to the target set.

In the following, two methods will be introduced for how to determine the first set of PDCCH candidates and the second set of PDCCH candidates. However, it should be appreciated that there may also be other ways for determining the two sets of PDCCH candidates, and the scope of the application is not limited in this regards.

For example, in some embodiment, if it is determined that an index of a PDCCH candidate in the plurality of PDCCH candidates is below or equal to a predetermined index, the terminal device 120 may determines the PDCCH candidate belongs to the first set. In addition, if it is determined that the index of the PDCCH candidate exceeds a predetermined index, determining the first PDCCH candidate belongs to the second set.

In some examples, the predetermined value may be defined as floor $(M-1)/2$, M is the number of PDCCH candidates in a search space set. As such, for example, if there are 4 PDCCH candidates (i.e. M=4) in the search space set with indexes 0-3 for aggregation level 4, the predetermined index may be defined as floor $(4-1)/2=1$, for this aggregation level. As such, PDCCH candidates 0 and 1, which are below or equal to 1, are determined to be belonged to the first set of PDCCH candidates. The PDCCH candidates 2 and 3 exceeding 1 are determined to be belonged to the second set of PDCCH candidates.

Accordingly, in another example, if there are 5 PDCCH candidates (i.e. M=5) in the search space set with indexes 0-4, the predetermined index may be defined as floor $(5-1)/2=2$, for this aggregation level. As such, PDCCH candidates 0, 1 and 2, which are below or equal to 2, are determined to be belonged to the first set of PDCCH candidates. The PDCCH candidates 3 and 4 exceeding 2 are determined to be belonged to the second set of PDCCH candidates.

In some other embodiments, it may also be determined that if $(M-1)\bmod 2\neq 0$, TCI state A is determined for the index of the PDCCH candidate $i=0,1\ldots$ floor$(M-1)/2$, or $i=M-1$, and the TCI state B for other PDCCH candidates.

In some embodiments, a terminal device 120 may be configured with M PDCCH candidates corresponding to an aggregation level (For example, L. L is positive integer. For example, L may be at least one of $\{1, 2, 4, 8, 16\}$) in a search space set (For example, S. S is non-negative integer. For example, $0\leq S\leq 39$. For another example, $0<S<40$.), and M is positive integer. For example, $1\leq M\leq 8$. For example, one PDCCH candidate in the M PDCCH candidates may be indexed with $m_s$, and $m_s$ is a non-negative integer. For example, $m_s \in (0, 1, \ldots M-1)$.

In some embodiments, the terminal device 120 may be configured with two TCI states (for example, TCI state A and TCI state B) for the M PDCCH candidates. For example, the terminal device 120 may be configured with the two TCI states for the aggregation level L. For another example, the terminal device 120 may be configured with the two TCI states for the PDCCH candidates corresponding to the aggregation level L. For another example, the terminal device 120 may be configured with two TCI states for the search space set S. For another example, the terminal device 120 may be configured with two TCI states for a CORESET, and the CORESET is associated with the search space set S. For example, the two TCI states may be configured for the aggregation level L.

In some embodiments, the terminal device 120 may be configured with $N_{CCE}$ CCEs for a CORESET, and $N_{CCE}$ is positive integer. For example, $1\leq N_{CCE}\leq 45$. For another example, $1\leq N_{CCE}\leq 46$. For example, one CCE in the $N_{CCE}$ CCEs may be indexed with $n_c$, and $n_c$ is a non-negative integer. For example, $n_c \in (0, 1, \ldots N_{CCE}-1)$. For example, the CORESET is associated with the search space set S. For another example, the M PDCCH candidates correspond to the aggregation level L in the search space set S.

In some embodiments, the PDCCH candidate $m_s$ is associated with TCI state A if $m_s\leq$floor$((M-1)/2)$. And the PDCCH candidate $m_s$ is associated with TCI state B if $m_s >$floor$((M-1)/2)$. In some embodiments, the PDCCH candidate $m_s$ is associated with TCI state A if $m_s\leq$ceil$((M-1)/2)$. And the PDCCH candidate $m_s$ is associated with TCI state B if $m_s>$ceil$((M-1)/2)$. In some embodiments, the PDCCH candidate $m_s$ is associated with TCI state A if $m_s<\text{floor}((M-1)/2)$. And the PDCCH candidate $m_s$ is associated with TCI state B if $m_s\geq\text{floor}((M-1)/2)$. In some embodiments, the PDCCH candidate $m_s$ is associated with TCI state A if $m_s<\text{ceil}((M-1)/2)$. And the PDCCH candidate $m_s$ is associated with TCI state B if $m_s\geq\text{ceil}((M-1)/2)$.

In some embodiments, the PDCCH candidate $m_s$ is associated with TCI state A if $m_s$ mod 2=0. And the PDCCH candidate $m_s$ is associated with TCI state B if $m_s$ mod 2=1 or $m_s$ mod 2≠0. In some embodiments, the PDCCH candidate $m_s$ is associated with TCI state B if $m_s$ mod 2=0. And the PDCCH candidate $m_s$ is associated with TCI state A if $m_s$ mod 2=1 or $m_s$ mod 2≠0.

In some embodiments, if (M−1) mod 2≠0, the PDCCH candidate $m_s$ is associated with TCI state A if $m_s\leq\text{floor}((M-1)/2)$. And the PDCCH candidate $m_s$ is associated with TCI state A if $m_s$=M−1. And the PDCCH candidate $m_s$ is associated with TCI state B if $\text{floor}((M-1)/2)<m_s<M-1$, and if (M−1) mod 2=0, the PDCCH candidate $m_s$ is associated with TCI state A if $m_s\leq\text{floor}((M-1)/2)$. And the PDCCH candidate $m_s$ is associated with TCI state B if $\text{floor}((M-1)/2)<m_s\leq M-1$.

In some embodiments, if (M−1) mod 2≠0, the PDCCH candidate $m_s$ is associated with TCI state A if $m_s\leq\text{ceil}((M-1)/2)$. And the PDCCH candidate $m_s$ is associated with TCI state A if $m_s$=M−1. And the PDCCH candidate $m_s$ is associated with TCI state B if $\text{ceil}((M-1)/2)<m_s<M-1$, and if (M−1) mod 2=0, the PDCCH candidate $m_s$ is associated with TCI state A if $m_s\leq\text{ceil}((M-1)/2)$. And the PDCCH candidate $m_s$ is associated with TCI state B if $\text{ceil}((M-1)/2)<m_s\leq M-1$.

In some embodiments, if (M−1) mod 2≠0, the PDCCH candidate $m_s$ is associated with TCI state A if $m_s<\text{floor}((M-1)/2)$. And the PDCCH candidate $m_s$ is associated with TCI state A if $m_s$=M−1. And the PDCCH candidate $m_s$ is associated with TCI state B if $\text{floor}((M-1)/2)\leq m_s<M-1$, and if (M−1) mod 2=0, the PDCCH candidate $m_s$ is associated with TCI state A if $m_s<\text{floor}((M-1)/2)$. And the PDCCH candidate $m_s$ is associated with TCI state B if $\text{floor}((M-1)/2)\leq m_s\leq M-1$.

In some embodiments, if (M−1) mod 2≠0, the PDCCH candidate $m_s$ is associated with TCI state A if $m_s<\text{ceil}((M-1)/2)$. And the PDCCH candidate $m_s$ is associated with TCI state A if $m_s$=M−1. And the PDCCH candidate $m_s$ is associated with TCI state B if $\text{ceil}((M-1)/2)\leq m_s<M-1$, and if (M−1) mod 2=0, the PDCCH candidate $m_s$ is associated with TCI state A if $m_s<\text{ceil}((M-1)/2)$. And the PDCCH candidate $m_s$ is associated with TCI state B if $\text{ceil}((M-1)/2)\leq m_s\leq M-1$.

In some embodiments, the PDCCH candidate $m_s$ is associated with TCI state A if $P\leq m_s\leq Q$. P and Q are non-negative integer, and $P\leq Q$. For example, $0\leq P\leq M-1$. For example, $0\leq Q\leq M-1$. In some embodiments, the PDCCH candidate $m_s$ is associated with TCI state B if $P\leq m_s\leq Q$. P and Q are non-negative integer, and $P\leq Q$. For example, $0\leq P\leq M-1$. For example, $0\leq Q\leq M-1$.

In some embodiments, there may be two sets of CCEs (for example, CCE set E1 and CCE set E2) in the $N_{CCE}$ CCEs, and $N_{CCE}$ is positive integer. For example, $1\leq N_{CCE}\leq45$. For another example, $1\leq N_{CCE}\leq46$. For example, one CCE in the $N_{CCE}$ CCEs may be indexed with $n_c$, and $n_c$ is a non-negative integer. For example, $n_c\in(0, 1, \ldots N_{CCE}-1)$. In some embodiments, the CCE set E1 may include the CCEs with index $0\leq n_c\leq N_{CCE}/2-1$. And the CCE set E2 may include CCEs with index $N_{CCE}/2\leq n_c\leq N_{CCE}-1$. In some embodiments, the CCE set E1 may include the CCEs with index $n_c$ mod 2=0. And the CCE set E2 may include CCEs with index $n_c$ mod 2=1 or with index $n_c$ mod 2≠0.

In some embodiments, the CCE set E1 may include the CCEs with index $P_{CCE}\leq n_c\leq Q_{CCE}$. And the CCE set E2 may include CCEs with index not satisfies $P_{CCE}\leq n_c\leq Q_{CCE}$. $P_{CCE}$ and $Q_{CCE}$ are non-negative integer, and $P_{CCE}\leq Q_{CCE}$. For example, $0\leq P_{CCE}\leq N_{CCE}-1$. For example, $0\leq Q_{CCE}\leq N_{CCE}-1$. In some embodiments, the CCE set E1 may include the CCEs with index $0\leq n_c\leq P_{CCE}$ or with index $Q_{CCE}\leq n_c\leq N_{CCE}-1$. And the CCE set E2 may include CCEs with index not satisfies $0\leq n_c\leq P_{CCE}$ and not satisfies $Q_{CCE}\leq n_c\leq N_{CCE}-1$. $P_{CCE}$ and $Q_{CCE}$ are non-negative integer, and $P_{CCE}\leq Q_{CCE}$. For example, $0\leq P_{CCE}\leq N_{CCE}-1$. For example, $0\leq Q_{CCE}\leq N_{CCE}-1$.

In some embodiments, the CCE set E1 may include the CCEs with index $0\leq n_c\leq H-1$. In some embodiments, the CCE set E2 may include the CCEs with index $H\leq n_c\leq 2*H-1$. In some embodiments, the CCE set E1 may include the CCEs with index $2*H\leq n_c\leq N_{CCE}-1$. In some embodiments, the CCE set E2 may include the CCEs with index $2*H\leq n_c\leq N_{CCE}-1$. In some embodiments, H may be (floor $(M_L/2))*L$ or (ceil$(M_L/2))*L$. In some embodiments, L may be an aggregation level. For example, the aggregation level L may correspond to at least one or at least two PDCCH candidates in a search space set. For example, L may be any one of $\{1, 2, 4, 8, 16\}$. In some embodiments, L may be the maximum value of aggregation level which is configured in a search space set. In some embodiments, L may be the maximum value of aggregation level which is configured in a search space set, and the aggregation level L corresponds to at least one or at least two PDCCH candidates. In some embodiments, L may be the maximum value of aggregation level which is configured in a search space set, and the aggregation level L corresponds to at least one or at least two PDCCH candidates, and at least one of: the at least one or at least two PDCCH candidates are associated and/or linked to another PDCCH candidate, the at least one or at least two PDCCH candidates are configured with a parameter R1 or R2, and the at least one or at least two PDCCH candidates are associated with two TCI states. In some embodiments, $M_L$ may be the number of PDCCH candidates corresponding to the aggregation level L. For example, $M_L$ is a positive integer. For example, $1\leq M_L\leq8$. For example, $2\leq M_L\leq8$.

In some embodiments, if a PDCCH candidate corresponding to an aggregation level in a search space set is associated with at least one TCI states (for example, two TCI states), the PDCCH candidate is not monitored. In some embodiments, if at least one CCE in the set of CCEs corresponding to the PDCCH candidate in a search space set is associated with at least one TCI states (for example, two TCI states), the PDCCH candidate is not monitored.

In some embodiments, the PDCCH candidate $m_s$ is associated with TCI state A if $m_s$=0. And the PDCCH candidate $m_s$ is associated with TCI state A if the index of CCE for the PDCCH candidate $m_s$ and the index of CCE for the PDCCH candidate $m_s$=0 are in same CCE set (for example CCE set E1 or CCE set E2). For example, if the index of CCE for the PDCCH candidate $m_s$=0 is in CCE set E1, the PDCCH candidate $m_s$ is associated with TCI state A if the index of CCE the PDCCH candidate $m_s$ is in CCE set E1. And the PDCCH candidate $m_s$ is associated with TCI state B if the index of CCE the PDCCH candidate $m_s$ is in CCE set E2. For another example, if the index of CCE for the PDCCH candidate $m_s$=0 is in CCE set E2, the PDCCH candidate $m_s$ is associated with TCI state A if the index of CCE the PDCCH candidate $m_s$ is in CCE set E2. And the PDCCH candidate $m_s$ is associated with TCI state B if the index of CCE the PDCCH candidate $m_s$ is in CCE set E1.

In the following part, detailed examples of an arrangement of a plurality of PDCCH candidates in various aggregation levels and a mapping result between TCIs and PDCCH candidates will be introduced with reference to FIGS. 3A-3B.

Figure 3A:
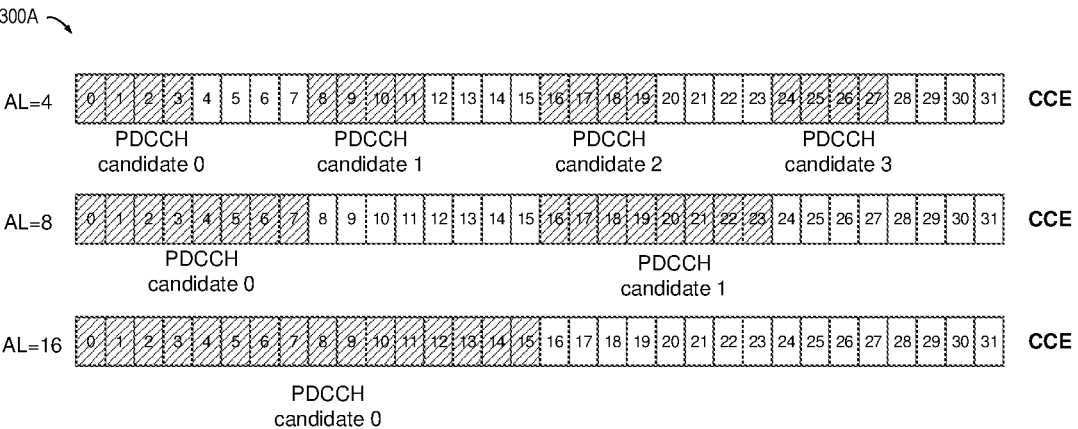
FIG. 3A is diagrams illustrating an arrangement of a plurality of PDCCH candidates in various aggregation levels in accordance with some embodiments of the present disclosure.

FIG. 3A is a diagram illustrating an arrangement of a plurality of PDCCH candidates in various aggregation levels in accordance with some embodiments of the present disclosure. It should be appreciated that the number of CCEs in a search space set is not limited to 32 can also be other numbers. Meanwhile the aggregation level is not limited to 4, 8, or 16, but can also be 1, 2 or any other numbers. The scope of the present application is not limited in this regard. Further, there may also be more search space set associated with a CORESET.

As shown in FIG. 3A, there are 32 CCEs with index 0-31 in a CORESET. In the CORESET, there is a plurality of PDCCH candidates in a search space set and associated with two TCI states of the CORESET. In specific, as shown, for aggregation level 4, 4 PDCCH candidates in one search space set, with each PDCCH candidate corresponding to one search space. Further, there are 4 CCEs in one PDCCH candidate.

In one example, the terminal device 120 monitors on each of the 4 PDCCH candidates (i.e. PDCCH candidates 0-3) for detecting a PDCCH transmission. As a result of monitoring, there may be a PDCCH transmission on a PDCCH candidate and there may also be no PDCCH transmission on the PDCCH candidate.

In addition, it can be configured at both the terminal device 120 and the network device 110 the following: PDCCH candidate 0 includes CCEs 0-3; PDCCH candidate 1 includes CCEs 5-8; PDCCH candidate 2 includes CCEs 16-19; and PDCCH candidate 3 includes CCEs 24-27.

Similarly, for aggregation level 8, there are 8 CCEs in each of two PDCCH candidates (i.e. PDCCH candidate 0 and PDCCH candidate 1). Accordingly, it may be configured at both the terminal device 120 and the network device 110 that PDCCH candidate 0 includes CCEs 0-7; PDCCH candidate 1 includes CCEs 16-23. For aggregation level 16, there are 16 CCEs in a PDCCH candidate (i.e. PDCCH candidate 0). Accordingly, it may be preconfigured at the terminal device 120 that PDCCH candidate 0 includes CCEs 0-15.

In some embodiments, the information on which aggregation levels are used could also be transmitted from the network device 110 to the terminal device 120. Alternatively, this information may also be pre-configured at both the network device 110 and the terminal device 120.

Figure 3B:
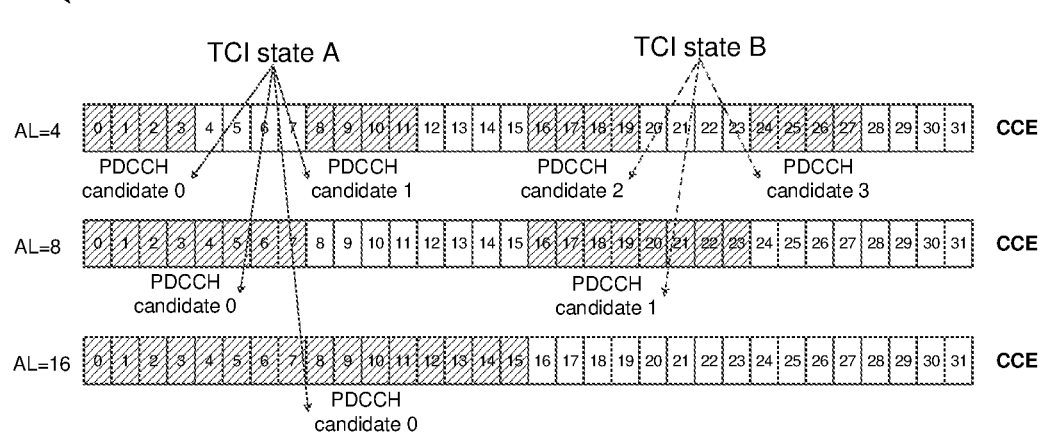
FIGS. 3B-3C are diagrams illustrating TCI states for PDCCH candidates in accordance with some embodiments of the present disclosure.

FIG. 3B is a diagram illustrating TCI states for PDCCH candidates in accordance with some embodiments of the present disclosure. It should be appreciated that the number of TCI states used in one CORESET is not limited to two TCI states (i.e. TCI state A and TCI state B) as shown and may also be any other numbers. The scope of the present application is not limited in this regard.

As mentioned above, when it is determined that an index of a PDCCH candidate in the plurality of PDCCH candidates is below or equal to a predetermined index, the terminal device 120 may determines the PDCCH candidate belongs to the first set, and if it is determined that the index of the PDCCH candidate exceeds a predetermined index, determining the first PDCCH candidate belongs to the second set. That is, as a result of the determination, each PDCCH candidate in the first set of PDCCH candidates having an index below or equal to the first predetermined index, and each PDCCH candidate in the second set of PDCCH candidates having an index exceeding the first predetermined index.

Accordingly, as shown in FIG. 3B, TCI state A is determined for PDCCH candidate for the aggregation level 16, and the same TCI state (i.e. TCI state A) is determined for both PDCCH candidate 0 for the aggregation level 8 and for PDCCH candidates 0 and 1 for the aggregation level 4. Then, TCI state B is determined for the PDCCH candidate 1 for the aggregation level 8, and the same TCI (i.e. TCI state B) is determined for PDCCH candidates 2 and 3 for the aggregation level 4.

Thus, it is ensured that PDCCH candidates on overlapped CCEs are associated with the same TCI state (e.g., either TCI A or TCI B). Considering that when blind detection is performed at the terminal device 120, different beams (e.g., transmitting beams and receiving beams), processing methods and channel estimation methods are used for different TCI states, thus when both of the two TCI states are determined for an overlapped CCE index in various aggregation levels (e.g., CCE 0 are determined for both TCI state A and B), it means that blind detection and reception at the terminal device 120 are needs to be done twice (i.e. one time with TCI state A, and the other time with TCI state B). Therefore, when PDCCH candidates on overlapped CCEs are associated with same TCI state as mentioned in the above example, the complexity of the terminal device 120 for blind detection or decoding can be reduced.

In some embodiments, as another way of determining the first set of PDCCH candidates and the second set of PDCCH candidates, the terminal device 120 may divide the plurality of PDCCH candidates into two sets of PDCCH candidates (e.g., the first set of PDCCH candidates and the second set of PDCCH candidates), and if it is determined that an index of a PDCCH candidate is an even number, the terminal device 120 may determines the PDCCH candidate belongs to the first set. In addition, if it is determined that the index of the PDCCH candidate is an odd number, determining the PDCCH candidate belongs to the second set.

In some examples, it is assumed that the index of the PDCCH candidate is i, then the terminal device 120 may perform a modulo calculation with divisor 2 and i as dividend, that is to calculate (i mod(2)) to obtain the remainder. That is TCI state A for i=0,1, . . . floor(M−1)/2, and TCI state B for others.

As such, for example, if there are 4 PDCCH candidates (i.e. M=4) in the search space set with indexes 0-3 for aggregation level 4. Then, by calculating with (i mod(2)), the remainder for PDCCH candidates 0 and 2 is 0, then PDCCH candidates 0 and 2 are determined to be belonged to the first set of PDCCH candidates. By calculating with (i mod(2)), the remainder for PDCCH candidates 1 and 3 is 1, The PDCCH candidates 1 and 3 are determined to be belonged to the second set of PDCCH candidates.

In the following part, a more detailed example of the determined TCI states for each candidates for different aggregation level with the above method will be provide with reference to FIG. 3C.

Figure 3C:
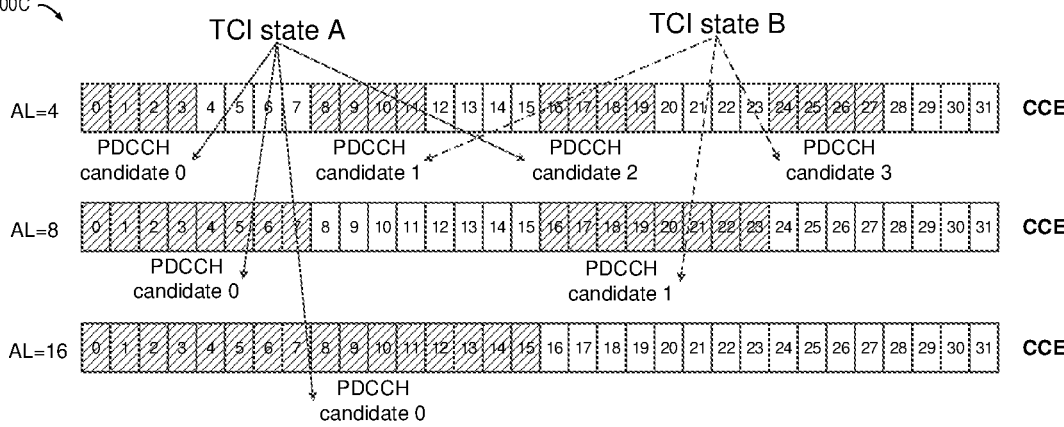

FIG. 3C is a diagram illustrating TCI states for PDCCH candidates in accordance with some embodiments of the present disclosure. It should be appreciated that the number of TCI states used in one CORESET is not limited to two TCI states (i.e. TCI state A and TCI state B) as shown and may also be any other numbers. The scope of the present application is not limited in this regard.

As mentioned above, as a result of determination with the above method, as shown in FIG. 3C, TCI state A is determined for the PDCCH candidate 0 for the aggregation level 16, and the same TCI state (i.e. TCI state A) is determined for both PDCCH candidate 0 for the aggregation level 8 and PDCCH candidate 0 and 2 for the aggregation level 4. Then, TCI state B is determined for the PDCCH candidate 1 for the aggregation level 8, and the same TCI (i.e. TCI state B) is determined for both PDCCH candidates 1 and 3 for the aggregation level 4.

Accordingly, it is ensured that PDCCH candidates on overlapped CCEs are associated with the same TCI state (e.g., either TCI A or TCI B), and the complexity of the terminal device 120 for blind detection or decoding can be reduced.

In some embodiments, for a search space set s associated with CORESET p, the CCE indexes for aggregation level L corresponding to PDCCH candidate $m_{s,n_{CI}}$ of the search space set in slot $$n_{s,f}^{\mu}$$

for an active downlink (DL) bandwidth part (BWP) of a serving cell corresponding to carrier indicator field value $n_{CI}$ are given by below formula (1):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{L}} \right\rfloor + n_{CI} \right) \bmod \lfloor N_{CCE,p}/L \rfloor \right\} + i \quad (1)$$

where for any common search space (CSS), $Y_{p,n_{s,f}^{\mu}}=0$; for a UE-specific search space (USS), $$Y_{p,n_{s,f}^{\mu}} = \left( A_p \cdot Y_{p,n_{s,f}^{\mu}-1} \right) \bmod D,$$

$Y_{p,-1}=n_{RNTI}\neq 0$, $A_p=39827$ for pmod3=0, $A_p=39829$ for pmod3=1, $A_p=39839$ for pmod3=2, and D=65537; i=0, . . . , L−1; $N_{CCE,p}$ is the number of CCEs, numbered from 0 to $N_{CCE,p}-1$, in CORESET p and, if any, per RB set; $n_{CI}$ is the carrier indicator field value if the terminal device 120 is configured with a carrier indicator field by CrossCarrierSchedulingConfig for the serving cell on which PDCCH is monitored; otherwise, including for any CSS, $n_{CI}=0$; $m_{s,n_{CI}}=0, . . . ,$ $$M_{s,n_{CI}}^{(L)} - 1,$$

where $$M_{s,n_{CI}}^{(L)}$$

is the number of PDCCH candidates the terminal device 120 is configured to monitor for aggregation level L of a search space set s for a serving cell corresponding to $n_{CI}$.

In some embodiments, if the terminal device 120 is configured with two TCI states for the $M_{s,n_{CI}}^{(L)}$ PDCCH candidates (or the search space s or the CORESET), the first TCI state is applied to the PDCCH candidate if $m_{s,n_{CI}}$ mod2=0, and the second TCI state is applied otherwise.

Reference is now made back to FIG. 3B. For example, in some embodiments, the predetermined index may be preconfigured as 15. As such, for example, the index of the first CCE of PDCCH candidate 1 in aggregation level 4 is 8 which is below the preconfigured index 15, thus it is determined that TCI state A is used for the PDCCH candidate 1 in aggregation level 4. In another example, the index of the first CCE of PDCCH candidate 1 in aggregation level 8 is 16 which exceeds the predetermined index 15, thus it is determined that TCI state B is used.

As a result, with the above method, as shown in FIG. 3B, TCI state A is determined for PDCCH candidate 0 for the aggregation level 16, and the same TCI state (i.e. TCI state A) is determined for both PDCCH candidate 0 for the aggregation level 8 and for PDCCH candidates 0 and 1 for the aggregation level 4. Then, TCI state B is determined for the PDCCH candidate 1 for the aggregation level 8, and the same TCI (i.e. TCI state B) is determined for PDCCH candidates 2 and 3 for the aggregation level 4.

Accordingly, it is ensured that PDCCH candidates on overlapped CCEs are associated with the same TCI state (e.g., either TCI A or TCI B). Considering that when blind detection is performed at the terminal device 120, it is very likely that different beams (e.g., transmitting beams and receiving beams), processing methods and channel estimation methods are used for different TCI states, thus when both of the two TCI states are determined for an overlapped CCE index in various aggregation levels (e.g., CCE 0 are determined for both TCI state A and B), it means that blind detection and reception at the terminal device 120 are needs to be done twice (i.e. one time with TCI state A, and the other time with TCI state B). Therefore, when PDCCH candidates on overlapped CCEs are associated with same TCI state as mentioned in the above example, the complexity of the terminal device 120 for blind detection and/or decoding can be reduced.

In some other embodiments, if the terminal device 120 is configured with two TCI states for the $$M_{s,n_{CI}}^{(L)}$$

PDCCH candidates (or the search space s or the CORESET), the first TCI state is applied to the PDCCH candidate if $$\left\lfloor \frac{2 \cdot n_{CCE,0}}{N_{CCE}} \right\rfloor = 0,$$

otherwise the second TCI state is applied to the PDCCH candidate, and $N_{CCE}$ is a number of CCEs in a CORESET of the PDCCH candidates, $n_{CCE,0}$ is the index of a first CCE for the PDCCH candidate.

As such, PDCCH candidates on overlapped CCEs are associated with the same TCI state, thereby reducing the complexity of the terminal device 120 for blink detection or decoding. Meanwhile, since each of the TCI states are not bound to the indexes of CCEs (e.g., either TCI state A or TCI state B may be determined for the CCE index) or PDCCH candidates, as a result randomization can be achieved.

In some embodiments, if the terminal device 120 is configured with two TCI states for the $$M_{s,n_{CI}}^{(L)}$$

PDCCH candidates (or the search space s or the CORESET), the first TCI state is applied to the PDCCH candidate with $M_{s,n_{CI}}=0$, and applied to the PDCCH candidates if $$\left\lfloor \frac{2 \cdot n_{CCE,m_{s,n_{CI}}}}{N_{CCE}} \right\rfloor = \left\lfloor \frac{2 \cdot n_{CCE,0}}{N_{CCE}} \right\rfloor,$$

otherwise the second TCI state is applied to the PDCCH candidate, and $N_{CCE}$ is a number of CCEs in a CORESET of the PDCCH candidates, $n_{CCE,0}$ is the index of a first CCE for the PDCCH candidate with $m_{s,n_{CI}}=0$, and $$n_{CCE,m_{s,n_{CI}}}$$

is the index of a first CCE for the PDCCH candidate with $m_{s,n_{CI}}$.

In the communication network 100, the network device 110 may transmit DCI on a plurality of PDCCH candidates for scheduling the same PDSCH (such as, same data or same transport block) or same SPS PDSCH release to the terminal device 120. The terminal device 120 will perform monitoring on PDCCH candidate and may detect the DCI on one or more PDCCH candidates from the network device 110. For example, the DCI may not be detected by the terminal device 120 or may be detected on one or more of the PDCCH candidates. The network device 110 may transmit the PDSCH to the terminal device 120. In response to the DCI being detected on a PDCCH candidate, the terminal device 120 may decode the PDSCH transmitted from the network device 110. Meanwhile, in response to detecting the DCI or DCI format scheduling the physical downlink shared channel (PDSCH) reception or a semi persistent scheduling (SPS) PDSCH release, the terminal device 120 may provide hybrid automatic repeat request (HARQ)-acknowledgement (ACK) information in a PUCCH transmission.

Whereas, the inventor of the present application noticed that for linked/associated PDCCH candidates that received the same data (i.e. PDCCH used for repeated PDCCH), there is no solution of how to design a CCE index for PUCCH resource for the repeated or multi-chance PDCCH. Meanwhile, there are also other scenarios (e.g., frequency hopping) in which PUCCH resource needs to be designed well.

Accordingly, embodiments of the present disclosure provide a solution to solve the problems above and/or one or more of other potential problems. This solution the terminal device receives a PDCCH with DCI on a first PDCCH candidate. Then the terminal device determines a resource for transmitting feedback information based on an index of a first control channel element (CCE) for a second PDCCH candidate.

As a result, PDCCH candidates for same PDSCH scheduling or SPS PDSCH release is able to be linked to the same PUCCH resource for HARQ-ACK feedback, thus saving the PUCCH resource and improving the resource utilization efficiency.

Figures 4, 5, 6:
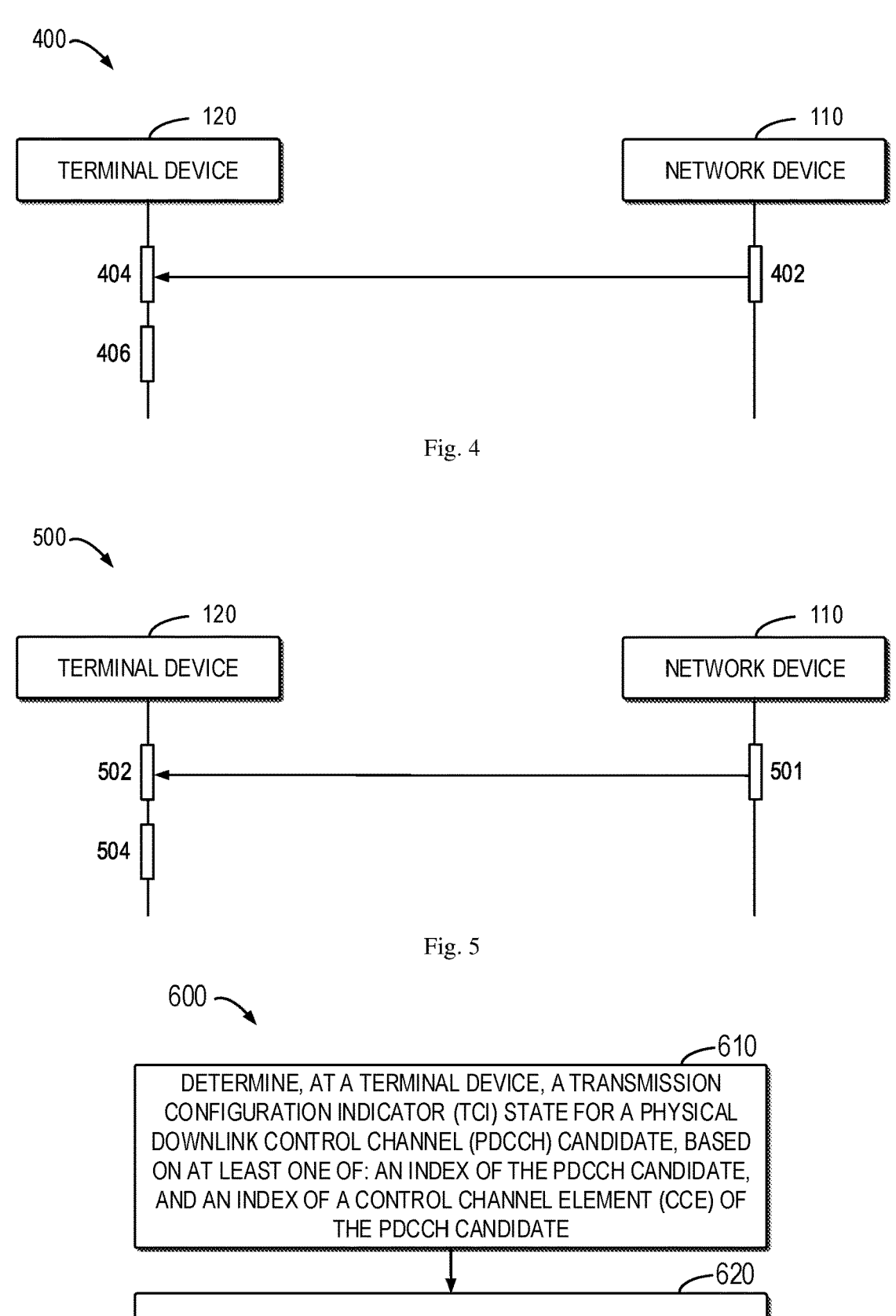
FIG. 4 is a signaling chart illustrating the process of determining PUCCH index resource in accordance with some embodiments of the present disclosure.
FIG. 5 is a signaling chart illustrating the process of determining PUCCH index resource in accordance with some embodiments of the present disclosure.
FIG. 6 illustrates a flowchart of a method of communication in accordance with some example embodiments of the present disclosure.

Reference is now made to FIG. 4. FIG. 4 shows a signaling flow 400 illustrating the process of determining PUCCH index resource in accordance with some embodiments of the present disclosure. For the purpose of discussion, the signaling flow 400 will be described with reference to FIG. 1. The signaling flow 400 may involve the terminal device 120, the network device 110 as illustrated in FIG. 1.

In the signalling flow 400, a network device 120 transmits 402 to a terminal device 110 a PDCCH with a DCI on a first PDCCH candidate. The terminal device 120 receives 404 the PDCCH with a DCI on a first PDCCH candidate, and the terminal device 120 determines 406 a resource for receiving feedback information based on an index of a first CCE for a second PDCCH candidate. Meanwhile, the network device 120 may also determines a resource for transmitting feedback information based on an index of a first CCE for a second PDCCH candidate.

With the above method, PDCCH candidates for the same PDSCH scheduling or SPS PDSCH release can link to the same PUCCH resource for HARQ-ACK feedback, thereby saving the PUCCH resource, thus improving the resource utilization efficiency, especially for associated PDCCH candidates or PDCCH candidates being linked.

In some embodiments, the terminal device 120 may determine a resource for receiving feedback information based on an index of a first control channel element (CCE) for a second PDCCH candidate, and at least one of a number of CCEs in a first CORESET of the first PDCCH candidate, a number of CCEs in a second CORESET of the second PDCCH candidate, and a value of a PUCCH resource indicator field in the DCI.

In some embodiments, the terminal device 120 may also determining the resource for receiving the feedback information based on association information (e.g., a parameter) about the first PDCCH candidate. Then the association information may indicate association of the first PDCCH candidate with the second PDCCH candidate, association of a first search space for the first PDCCH candidate with a second search space for the second PDCCH candidate, association of the first CORESET with the second CORESET, or whether the PDCCH candidate is used for a repeated PDCCH.

In the following part, a more concrete example will be shown on how to determine the resource for receiving feedback information.

In some embodiments, if the terminal device 120 provides HARQ-ACK information in a PUCCH transmission in response to detecting a DCI format scheduling a PDSCH reception or a SPS PDSCH release, the terminal device 120 may determine a PUCCH resource with index $r_{PUCCH}$, $0 \leq r_{PUCCH} \leq 15$, as the following formula 2:

$$r_{PUCCH} = \left\lfloor \frac{2 \cdot n_{CCE,r}}{N_{CCE,r}} \right\rfloor + 2 \cdot \Delta_{PRI}, \tag{2}$$

where $N_{CCE,r}$ is a number of CCEs in a (linked/associated) CORESET (which is linked/associated with the CORESET of a PDCCH reception with the DCI format), as described in Clause 10.1, $n_{CCE,r}$ is the index of a first CCE for a PDCCH candidate (which is linked/associated with the PDCCH candidate for the PDCCH reception), and $\Delta_{PRI}$ is a value of the PUCCH resource indicator field in the DCI format, if the DCI format is monitored in a CORESET (and/or a search space and/or a PDCCH candidate) (configured with parameter R1 (e.g., repeated or linked) or configured to be linked/associated with a (another) CORESET (and/or a search space and/or a PDCCH candidate)). Otherwise, the following formula (x) is applied:

$$r_{PUCCH} = \left\lfloor \frac{2 \cdot n_{CCE,0}}{N_{CCE}} \right\rfloor + 2 \cdot \Delta_{PRI}, \tag{3}$$

where $N_{CCE}$ is a number of CCEs in a CORESET of a PDCCH reception with the DCI format, as described in Clause 10.1, $n_{CCE,0}$ is the index of a first CCE for the PDCCH reception, and $\Delta_{PRI}$ is a value of the PUCCH resource indicator field in the DCI format.

In the following part, another way for determining a CCE index for PUCCH resource for the repeated or multi-chance PDCCH will be introduced.

Reference is now made to FIG. 5. FIG. 5 shows a signaling flow 500 illustrating the process of determining PUCCH index resource in accordance with some embodiments of the present disclosure. For the purpose of discussion, the signaling flow 500 will be described with reference to FIG. 1. The signaling flow 500 may involve the terminal device 120, the network device 110 as illustrated in FIG. 1.

In the signalling flow 500, the network device 110 transmits 501 a PDCCH with DCI on a PDCCH candidate to a terminal device 120. The terminal device 120 receives 502 the PDCCH with DCI on the PDCCH candidate. Then the terminal device 120 determines 504 a resource for transmitting feedback information at least based on an offset, an index of a first CCE for the PDCCH candidate, a number of CCEs in a CORESET of the PDCCH candidate and a value of a PUCCH resource indicator field in the DCI.

With the above solution, PDCCH candidates for the same PDSCH scheduling or SPS PDSCH release can link to the same PUCCH resource for HARQ-ACK feedback, thereby saving the PUCCH resource, thus improving the resource utilization efficiency, especially for associated PDCCH candidates or PDCCH candidates being linked.

-continued $$r_{PUCCH} = \left( \left\lfloor \frac{2 \cdot n_{CCE,0}}{N_{CCE}} \right\rfloor + n_{offset} \right) \bmod 2 + 2 \cdot \Delta_{PRI}, \quad (9)$$

where $N_{CCE}$ is the number of CCEs in a CORESET of a PDCCH reception with the DCI format, as described in Clause 10.1, $n_{CCE,0}$ is the index of a first CCE for the PDCCH reception, $n_{offset}$ is configured by higher layer parameter, and $\Delta_{PRI}$ is a value of the PUCCH resource indicator field in the DCI format, if the DCI format is monitored in a CORESET (and/or a search space and/or a PDCCH candidate) (configured with parameter X (e.g. repeated or linked) or configured to be linked/associated with a (another) CORESET (and/or a search space and/or a PDCCH candidate)). Otherwise, the following formula (10) applies:

$$r_{PUCCH} = \left\lfloor \frac{2 \cdot n_{CCE,0}}{N_{CCE}} \right\rfloor + 2 \cdot \Delta_{PRI}, \quad (10)$$

where $N_{CCE}$ is a number of CCEs in a CORESET of a PDCCH reception with the DCI format, as described in Clause 10.1, $n_{CCE,0}$ is the index of a first CCE for the PDCCH reception, and $\Delta_{PRI}$ is a value of the PUCCH resource indicator field in the DCI format.

In some embodiments, the offset may be configured by RRC, MAC CE and DCI. Taking RRC as an example, the offset may be transmitted from the network device to the terminal device 120 as follows:

| SearchSpace ::= | SEQUENCE { |
|---|---|
| ... | |
| nrofCandidates | SEQUENCE { |
| aggregationLevel1 offset | ENUMERATED {n0, n1, n2, n3, n4, n5, n6, n8}, |
| aggregationLevel2 offset | ENUMERATED {n0, n1, n2, n3, n4, n5, n6, n8}, |
| aggregationLevel4 offset | ENUMERATED {n0, n1, n2, n3, n4, n5, n6, n8}, |
| aggregationLevel8 offset | ENUMERATED {n0, n1, n2, n3, n4, n5, n6, n8}, |
| aggregationLevel16 offset | ENUMERATED {n0, n1, n2, n3, n4, n5, n6, n8} |
| } | |

In some embodiments, if the terminal device 120 provides HARQ-ACK information in a PUCCH transmission in response to detecting a DCI format scheduling a PDSCH reception or a SPS PDSCH release, the UE determines a PUCCH resource with index $r_{PUCCH}$, $0 \le r_{PUCCH} \le 15$, as any one of the following formulas (4)-(9) as below:

$$r_{PUCCH} = \left\lfloor \frac{2 \cdot (n_{CCE,0} + n_{offset})}{N_{CCE}} \right\rfloor + 2 \cdot \Delta_{PRI} \quad (4)$$

$$r_{PUCCH} = \left\lfloor \frac{2 \cdot ((n_{CCE,0} + n_{offset}) \bmod N_{CCE})}{N_{CCE}} \right\rfloor + 2 \cdot \Delta_{PRI} \quad (5)$$

$$r_{PUCCH} = \left\lfloor \frac{(2 \cdot (n_{CCE,0} + n_{offset})) \bmod (2 \cdot N_{CCE})}{N_{CCE}} \right\rfloor + 2 \cdot \Delta_{PRI} \quad (6)$$

$$r_{PUCCH} = \left\lfloor \frac{2 \cdot n_{CCE,0} + n_{offset}}{N_{CCE}} \right\rfloor + 2 \cdot \Delta_{PRI} \quad (7)$$

$$r_{PUCCH} = \left\lfloor \frac{(2 \cdot n_{CCE,0} + n_{offset}) \bmod (2 \cdot N_{CCE})}{N_{CCE}} \right\rfloor + 2 \cdot \Delta_{PRI} \quad (8)$$

In some examples, the offset may be configured with a range of $(0, 1, \ldots N_{CCE}-1)$. For example, the offset may be an offset of CCE index. Alternatively, the offset may be with a range of $(0, 1)$.

In some embodiments, the offset may be determined/calculated based on the offset between the index of the first CCE for the PDCCH reception monitored in the first PDCCH candidate (e.g. nCCE, 0) and the index of the first CCE for a second PDCCH candidate (e.g. nCCE, r). The second PDCCH candidate is configured to be linked/associated with the first PDCCH candidate. For example, the offset may be $n_{offset}=n_{CCE,r}-n_{CCE,0}$.

FIG. 6 illustrates a flowchart of an example method 600 in accordance with some embodiments of the present disclosure. The method 600 can be implemented at a terminal device 120 as shown in FIG. 1. It is to be understood that the method 600 may include additional blocks not shown and/or may omit some blocks as shown, and the scope of the present disclosure is not limited in this regard. For the purpose of discussion, the method 600 will be described from the perspective of the terminal device 120 with reference to FIG. 1.

At block 610, the terminal device determines a transmission configuration indicator (TCI) state for a physical downlink control channel (PDCCH) candidate, based on at least one of: an index of the PDCCH candidate, and an index of a control channel element (CCE) of the PDCCH candidate. Then, at block 620, the terminal device monitors the PDCCH candidate based on the TCI state.

In some embodiments, the PDCCH candidate is one of a plurality PDCCH candidates for an aggregation level in a search space set.

In some embodiments, the TCI state is at least one of: a first TCI state from a set of two TCI states, and a second TCI state from the set of two TCI states.

In some embodiments, the TCI state is a first TCI state if the index of the PDCCH candidate belongs to a first set.

In some embodiments, the TCI state is a second TCI state if the index of the PDCCH candidate belongs to a second set.

In some embodiments, determining the TCI state comprises: in accordance with a determination that a first condition related to the index of the PDCCH candidate is satisfied, determining a first TCI state as the TCI state; and in accordance with a determination that the first condition is not satisfied, determining a second TCI state as the TCI state.

In some embodiments, the first condition is whether the index of the PDCCH candidate is an even number.

In some embodiments, determining the TCI state comprises: determining the TCI state based on the index of the PDCCH candidate and the number of PDCCH candidates in a search space set.

In some embodiments, determining the TCI state comprises: in accordance with a determination that a second condition related to both the index of the PDCCH candidate and the number of PDCCH candidates in a search space set is satisfied, determining a first TCI state as the TCI state; and in accordance with a determination that the second condition is not satisfied, determining a second TCI state as the TCI state.

In some embodiments, the second condition is whether the index of the PDCCH candidate is below or equals to a first predetermined index.

In some embodiments, determining the TCI state comprises: in accordance with a determination that a third condition of the index of the CCE is satisfied, determining a first TCI state as the TCI state; and in accordance with a determination that a third condition is not satisfied, determining the second TCI state as the TCI state.

In some embodiments, the third condition is whether the index of the CCE is below or equals to a first predetermined index.

In some embodiments, the third condition is whether the index of the CCE is an even number.

In some embodiments, determining the TCI state comprises: determining the TCI state based on the index of the CCE and the number of CCEs in a search space set.

In some embodiments, determining the TCI state further based on a first index of a CCE of a first PDCCH candidate in the set of PDCCH candidates.

In some embodiments, determining the TCI state based on a first index of a CCE of a first PDCCH candidate in the set of PDCCH candidates and the index of the CCE of the PDCCH candidate.

In some embodiments, determining the TCI state comprises: in response to a determination that the index of the CCE of the PDCCH candidate and the first index of the CCE of the first PDCCH candidate belong to a same CCE set, determining the first TCI state as the TCI state; and in response to a determination that the index of the CCE of the PDCCH candidate and the first index of the CCE of the first PDCCH candidate belong to different CCE sets, determining the second TCI state as the TCI state.

In some embodiments, the first PDCCH candidate is a PDCCH candidate with a lowest value of PDCCH candidate index in the set of PDCCH candidates.

In some embodiments, the first PDCCH candidate is a PDCCH candidate with a value of PDCCH candidate index to be zero in the set of PDCCH candidates.

In some embodiments, the CCE of the first PDCCH candidate is a CCE with a lowest value of CCE index in a set of CCEs corresponding to the first PDCCH candidate.

FIG. 7 illustrates a flowchart of an example method 700 in accordance with some embodiments of the present disclosure. The method 700 can be implemented at the network device 110 as shown in FIG. 1. It is to be understood that the method 800 may include additional blocks not shown and/or may omit some blocks as shown, and the scope of the present disclosure is not limited in this regard. For the purpose of discussion, the method 700 will be described from the perspective of the network device 110 with reference to FIG. 1.

At block 710, the network device determines a transmission configuration indicator (TCI) state for a physical downlink control channel (PDCCH) candidate, based on at least one of: an index of the PDCCH candidate, and an index of a control channel element (CCE) of the PDCCH candidate. Then, at block 720, the network device transmits, to a terminal device, a PDCCH transmission over the PDCCH candidate based on the TCI state In some embodiments, the PDCCH candidate is one of a plurality PDCCH candidates for an aggregation level in a search space set.

In some embodiments, the TCI state is at least one of: a first TCI state from a set of two TCI states, and a second TCI state from the set of two TCI states.

In some embodiments, the TCI state is a first TCI state if the index of the PDCCH candidate belongs to a first set.

In some embodiments, the TCI state is a second TCI state if the index of the PDCCH candidate belongs to a second set.

In some embodiments, determining the TCI state comprises: in accordance with a determination that a first condition related to the index of the PDCCH candidate is satisfied, determining a first TCI state as the TCI state; and in accordance with a determination that the first condition is not satisfied, determining a second TCI state as the TCI state.

In some embodiments, the first condition is whether the index of the PDCCH candidate is an even number.

In some embodiments, determining the TCI state comprises: determining the TCI state based on the index of the PDCCH candidate and the number of PDCCH candidates in a search space set.

In some embodiments, determining the TCI state comprises: in accordance with a determination that a second condition related to both the index of the PDCCH candidate and the number of PDCCH candidates in a search space set is satisfied, determining a first TCI state as the TCI state; and in accordance with a determination that the second condition is not satisfied, determining a second TCI state as the TCI state.

In some embodiments, the second condition is whether the index of the PDCCH candidate is below or equals to a first predetermined index.

In some embodiments, determining the TCI state comprises: in accordance with a determination that a third condition of the index of the CCE is satisfied, determining a first TCI state as the TCI state; and in accordance with a determination that a third condition is not satisfied, determining the second TCI state as the TCI state.

In some embodiments, the third condition is whether the index of the CCE is below or equals to a first predetermined index.

In some embodiments, the third condition is whether the index of the CCE is an even number.

In some embodiments, determining the TCI state comprises: determining the TCI state based on the index of the CCE and the number of CCEs in a search space set.

In some embodiments, determining the TCI state further based on a first index of a CCE of a first PDCCH candidate in the set of PDCCH candidates.

In some embodiments, determining the TCI state based on a first index of a CCE of a first PDCCH candidate in the set of PDCCH candidates and the index of the CCE of the PDCCH candidate.

In some embodiments, wherein determining the TCI state comprises: in response to a determination that the index of the CCE of the PDCCH candidate and the first index of the CCE of the first PDCCH candidate belong to a same CCE set, determining the first TCI state as the TCI state; and in response to a determination that the index of the CCE of the PDCCH candidate and the first index of the CCE of the first PDCCH candidate belong to different CCE sets, determining the second TCI state as the TCI state.

In some embodiments, the first PDCCH candidate is a PDCCH candidate with a lowest value of PDCCH candidate index in the set of PDCCH candidates.

In some embodiments, the first PDCCH candidate is a PDCCH candidate with a value of PDCCH candidate index to be zero in the set of PDCCH candidates.

In some embodiments, the CCE of the first PDCCH candidate is a CCE with a lowest value of CCE index in a set of CCEs corresponding to the first PDCCH candidate.

FIG. 8 illustrates a flowchart of an example method 800 in accordance with some embodiments of the present disclosure. The method 800 can be implemented at the terminal device 120 as shown in FIG. 1. It is to be understood that the method 800 may include additional blocks not shown and/or may omit some blocks as shown, and the scope of the present disclosure is not limited in this regard. For the purpose of discussion, the method 800 will be described from the perspective of the terminal device 120 with reference to FIG. 1.

At block 810, the terminal device receives a physical downlink control channel (PDCCH) with downlink control information (DCI) on a first PDCCH candidate. Then, at block 820, the terminal device determines a resource for transmitting feedback information based on an index of a first control channel element (CCE) for a second PDCCH candidate.

In some embodiments, determining the resource for transmitting the feedback information comprises: determining a resource for transmitting feedback information based on an index of a first control channel element (CCE) for a second PDCCH candidate, and at least one of: a number of CCEs in a first CORESET of the first PDCCH candidate, a number of CCEs in a second CORESET of the second PDCCH candidate, and a value of a PUCCH resource indicator field in the DCI.

In some embodiments, determining the resource for transmitting the feedback information comprises: determining, based on association information about the first PDCCH candidate, the resource for transmitting the feedback information.

In some embodiments, the association information indicates at least one of: association of the first PDCCH candidate with the second PDCCH candidate, association of a first search space for the first PDCCH candidate with a second search space for the second PDCCH candidate, association of the first CORESET with the second CORESET, and whether the PDCCH candidate is used for a repeated PDCCH.

In some embodiments, determining the resource for transmitting feedback information comprises: determining the resource for transmitting the feedback information based on the index of the first CCE for the second PDCCH candidate, a value of a PUCCH resource indicator field in the DCI, and at least one of the number of CCEs in the first CORESET and the number of CCEs in the second CORESET.

In some embodiments, the first CCE for the second PDCCH candidate is a CCE with a lowest value of CCE index in a set of CCEs corresponding to the second PDCCH candidate.

FIG. 9 illustrates a flowchart of an example method 900 in accordance with some embodiments of the present disclosure. The method 900 can be implemented at the network device 110 as shown in FIG. 1. It is to be understood that the method 800 may include additional blocks not shown and/or may omit some blocks as shown, and the scope of the present disclosure is not limited in this regard. For the purpose of discussion, the method 900 will be described from the perspective of the network device 110 with reference to FIG. 1.

At block 910, the network device transmits to a terminal device, a physical downlink control channel (PDCCH) with downlink control information (DCI) on a first PDCCH candidate. Then, at block 920, the network device determines a resource for receiving feedback information based on an index of a first control channel element (CCE) for a second PDCCH candidate.

In some embodiments, determining the resource for receiving the feedback information comprises: determining a resource for receiving feedback information based on an index of a first control channel element (CCE) for a second PDCCH candidate, and at least one of: a number of CCEs in a first CORESET of the first PDCCH candidate, a number of CCEs in a second CORESET of the second PDCCH candidate, and a value of a PUCCH resource indicator field in the DCI.

In some embodiments, determining the resource for receiving the feedback information comprises: determining, based on association information about the first PDCCH candidate, the resource for receiving the feedback information.

In some embodiments, the association information indicates at least one of: association of the first PDCCH candidate with the second PDCCH candidate, association of a first search space for the first PDCCH candidate with a second search space for the second PDCCH candidate, association of the first CORESET with the second CORESET, and whether the PDCCH candidate is used for a repeated PDCCH.

In some embodiments, determining the resource for receiving feedback information comprises: determining the resource for receiving the feedback information based on the index of the first CCE for the second PDCCH candidate, a value of a PUCCH resource indicator field in the DCI, and at least one of the number of CCEs in the first CORESET and the number of CCEs in the second CORESET.

In some embodiments, the first CCE for the second PDCCH candidate is a CCE with a lowest value of CCE index in a set of CCEs corresponding to the second PDCCH candidate.

FIG. 10 illustrates a flowchart of an example method 1000 in accordance with some embodiments of the present disclosure. The method 1000 can be implemented at the terminal device 120 as shown in FIG. 1. It is to be understood that the method 1000 may include additional blocks not shown and/or may omit some blocks as shown, and the scope of the present disclosure is not limited in this regard. For the purpose of discussion, the method 1000 will be described from the perspective of the terminal device 120 with reference to FIG. 1.

At block 1010, the terminal device receives a physical downlink control channel (PDCCH) with downlink control information (DCI) on a PDCCH candidate. Then, at block 1020, the terminal device determines a resource for transmitting feedback information at least based on an offset, an index of a first CCE for the PDCCH candidate, a number of CCEs in a control resource set (CORESET) of the PDCCH candidate and a value of a PUCCH resource indicator field in the DCI.

In some embodiments, the method further comprising: obtaining the offset via at least one of: a radio resource control (RRC) message, a medium access control-control element (MAC-CE) message, and the DCI.

In some embodiments, the first CCE for the PDCCH candidate is a CCE with a lowest value of CCE index in a set of CCEs corresponding to the PDCCH candidate.

In some embodiments, the network device 110 may configure, to the terminal device 120, a first set of PDCCH candidates (or PDCCH candidate A) and a second set of PDCCH candidates (or PDCCH candidate B). In some embodiments, the first set of PDCCH candidates (or PDCCH candidate A) and the second set of PDCCH candidates (or PDCCH candidate B) may correspond to a same aggregation level. In some embodiments, the first set of PDCCH candidates (or PDCCH candidate A) and the second set of PDCCH candidates (or PDCCH candidate B) may correspond to a same aggregation level in a same search space set.

In some embodiments, the first set of PDCCH candidates (or PDCCH candidate A) and the second set of PDCCH candidates (or PDCCH candidate B) may be in a same search space set. In some embodiments, the first set of PDCCH candidates (or PDCCH candidate A) may be in a first search space set, and the second set of PDCCH candidates (or PDCCH candidate B) may be in a second search space set. And the first search space set and the second search space set are associated with a same CORESET. For example, the first search space set and second search space set are different. In some embodiments, the first set of PDCCH candidates (or PDCCH candidate A) may be in a first search space set, and the second set of PDCCH candidates (or PDCCH candidate B) may be in a second search space set. And the first search space set is associated with a first CORESET, and second search space set is associated with a second CORESET. For example, the first CORESET and the second CORESET are different.

In some embodiments, the network device 110 may configure, to the terminal device 120, a first set of PDCCH candidates (or PDCCH candidate A) and a second set of PDCCH candidates (or PDCCH candidate B). In some embodiments, the first set of PDCCH candidates (or PDCCH candidate A) may correspond to an aggregation level L1, L1 is positive integer. For example, L1 may be at least one of $\{1, 2, 4, 8, 16\}$. In some embodiments, the second set of PDCCH candidates (or PDCCH candidate B) may correspond to an aggregation level L2, L2 is positive integer. For example, L2 may be at least one of $\{1, 2, 4, 8, 16\}$. In some embodiments, L1 may be same with L2. In some embodiments, L1 may be different from L2.

In some embodiments, the first set of PDCCH candidates (or PDCCH candidate A) may be configured in a first search space set (For example, set S1, S1 is non-negative integer. For example, $0 \le S1 \le 39$. For another example, $0 < S1 < 40$). In some embodiments, the second set of PDCCH candidates (or PDCCH candidate B) may be configured in a second search space set (For example, set S2, S2 is non-negative integer.

For example, $0 \le S2 \le 39$. For another example, $0 < S2 < 40$). In some embodiments, S1 may be same with S2. In some embodiments, S1 may be different from S2.

In some embodiments, the first search space set S1 and the second search space set S2 may be associated with a same CORESET. In some emodiments, the first search space set S1 may be associated with a first CORESET (For example, C1, C1 is non-negative integer. For example, $0 \le C1 < 16$.). In some embodiments, the second search space set S2 may be associated with a second CORESET (For example, C2, C2 is non-negative integer. For example, $0 \le C2 \le 16$.). In some embodiments, C1 may be same with C2. In some embodiments, C1 may be different from C2.

In some embodiments, one PDCCH candidate in the first set of M1 PDCCH candidates (M1 is positive integer. For example, $1 \le M1 \le 8$) may be indexed with $m_{s1}$, and $m_{s1}$ is a non-negative integer. For example, $m_{s1} \in (0, 1, \ldots M1-1)$. In some embodiments, one PDCCH candidate in the second set of M2 PDCCH candidates (M2 is positive integer. For example, $1 \le M2 \le 8$) may be indexed with $m_{s2}$, and $m_{s2}$ is a non-negative integer. For example, $m_{s2} \in (0, 1, \ldots M2-1)$. In some embodiments, the value of M1 may be same with the value of M2.

In some embodiments, the PDCCH candidate with index msi (for example, $1 \le m_{s1} \le M1$) in the first set of M1 PDCCH candidates and the PDCCH candidate with index $m_{s2} = m_{s1}$ (for example, $1 \le m_{s2}$ $\le M1$) in the second set of PDCCH candidates may be associated and/or linked with each other. In some embodiments, the DCI in the PDCCH on PDCCH candidate with index $m_{s1}$ (for example, $1 \le m_{s1} \le M1$) in the first set of M1 PDCCH candidates and the DCI in the PDCCH on the PDCCH candidate with index $m_{s2} = m_{s1}$ (for example, $1 \le m_{s2} \le M1$) in the second set of PDCCH candidates may be may be for scheduling a same communication. For example, when $M1 \le M2$. For example, for the PDCCH candidate with index $m_{s2}$ (for example, $M1 < m_{s2} \le M2$) in the second set of M2 PDCCH candidates, the PDCCH candidate may not be associated and/or linked to any one of PDCCH candidate in the first set of M1 PDCCH candidates.

In some embodiments, the PDCCH candidate with index $m_{s1} = m_{s2}$ (for example, $1 \le m_{s1} \le M2$) in the first set of M1 PDCCH candidates and the PDCCH candidate with index $m_{s2}$ (for example, $1 \le m_{s2} \le M2$) in the second set of PDCCH candidates may be associated and/or linked with each other. In some embodiments, the DCI in the PDCCH on PDCCH candidate with index $m_{s1} = m_{s2}$ (for example, $1 \le m_{s1} \le M2$) in the first set of M1 PDCCH candidates and the DCI in the PDCCH on the PDCCH candidate with index $m_{s2}$ (for example, $1 \le m_{s2} \le M2$) in the second set of PDCCH candidates may be may be for scheduling a same communication.

For example, when M2≤M1. For example, for the PDCCH candidate with index $m_{s1}$ (for example, M2<$m_s$1≤M1) in the first set of M1 PDCCH candidates, the PDCCH candidate may not be associated and/or linked to any one of PDCCH candidate in the second set of M2 PDCCH candidates.

In some embodiments, the PDCCH candidate with index $m_{s1}$=$m_{sr}$ (for example, 1≤$m_{sr}$≤min(M1, M2)) in the first set of M1 PDCCH candidates and the PDCCH candidate with index $m_{s2}$=$m_{sr}$ (for example, 1≤$m_{sr}$≤min(M1, M2)) in the second set of PDCCH candidates may be associated and/or linked with each other. In some embodiments, the DCI in the PDCCH on PDCCH candidate with index $m_{s1}$=$m_{sr}$ (for example, 1≤$m_{sr}$≤min(M1, M2)) in the first set of M1 PDCCH candidates and the DCI in the PDCCH on the PDCCH candidate with index $m_{s2}$=$m_{sr}$ (for example, 1≤$m_{sr}$≤min(M1, M2)) in the second set of PDCCH candidates may be may be for scheduling a same communication. For example, for the PDCCH candidate with index $m_{s1}$>min (M1, M2)) in the first set of M1 PDCCH candidates, the PDCCH candidate may not be associated and/or linked to any one of PDCCH candidate in the second set of M2 PDCCH candidates. For another example, for the PDCCH candidate with index $m_{s2}$>min(M1, M2)) in the second set of M2 PDCCH candidates, the PDCCH candidate may not be associated and/or linked to any one of PDCCH candidate in the first set of M1 PDCCH candidates.

In some embodiments, the PDCCH candidate with index $m_{s1}$ in the first set of M1 PDCCH candidates and the PDCCH candidate with index $m_{s2}$=($m_{s1}$+K) mod M1 in the second set of PDCCH candidates may be associated and/or linked with each other. For example, when M1≤M2. In some embodiments, the DCI in the PDCCH on PDCCH candidate with index nisi in the first set of M1 PDCCH candidates and the DCI in the PDCCH on the PDCCH candidate with index $m_{s2}$=($m_{s1}$+K) mod M1 in the second set of PDCCH candidates may be may be for scheduling a same communication. For example, when M1≤M2. In some embodiments, the PDCCH candidate with index $m_{s1}$=($m_{s2}$+K) mod M2 in the first set of M1 PDCCH candidates and the PDCCH candidate with index $m_{s2}$ in the second set of M2 PDCCH candidates may be associated and/or linked with each other. For example, when M1≤M2. In some embodiments, the DCI in the PDCCH on PDCCH candidate with index $m_{s1}$=($m_{s2}$+K) mod M2 in the first set of M1 PDCCH candidates and the DCI in the PDCCH on the PDCCH candidate with index $m_{s2}$ in the second set of M2 PDCCH candidates may be may be for scheduling a same communication. For example, when M1≤M2.

In some embodiments, the communication may include communication of at least one of the following: a PDSCH reception, a SPS PDSCH release, a PUSCH, a PUCCH, a CSI-RS, an aperiodic CSI-RS, a Zero power (ZP) CSI-RS, an aperiodic ZP CSI-RS, a SRS, an aperiodic SRS, a CSI report, an aperiodic CSI report, a HARQ feedback (ACK or NACK), a power control information, a transmit power control (TPC) information and so on.

In some embodiments, K is a non-negative integer. For example, K ∈ (0, 1, ... M−1). In some embodiments, K may be configured by at least one of RRC, MAC CE and DCI. In some embodiments, K may be ceil((M−1)/2) or floor((M−1)/2). In some embodiments, K may be 0 or 1 or 2.

In some embodiments, the network device 110 may transmit, to the terminal device 120, a configuration indicative of the first set of PDCCH candidates (or PDCCH candidate A) associated/linked with the second set of PDCCH candidates (or PDCCH candidate B). In some embodiments, the network device 110 may transmit, to the terminal device 120, a configuration indicative of the first search space set S1 associated/linked with the second search space set S2. In some embodiments, the network device 110 may transmit, to the terminal device 120, a configuration indicative of the first CORESET C1 associated/linked with the second CORESET C2. In some embodiments, the first CORESET C1 and/or the first search space set 51 and/or the first set of PDCCH candidates and/or PDCCH candidate A may be configured with a parameter R1 (e.g., the parameter may be "repeated" or "repetition" or "linked" in RRC and/or MAC CE). In some embodiments, the second CORESET C2 and/or the second search space set S2 and/or the second set of PDCCH candidates and/or PDCCH candidate B may be configured with a parameter R2 (e.g., the parameter may be "repeated" or "repetition" or "linked" or "first" or "initial" in RRC and/or MAC CE). For example, the first set and second set of PDCCH candidates are configured for scheduling at least one of same PDSCH, same data or same transport block(s), same PUSCH, same uplink data, same downlink data, same uplink transport block(s), same downlink transport block(s), same aperiodic CSI-RS transmission/reception, same aperiodic SRS transmission/reception, same PUCCH, same CSI feedback. For example, the configuration may be transmitted via any of RRC signaling, MAC CE and DCI. In some embodiments, the network device 110 may configure, to the terminal device 120, a third set of PDCCH candidates (or PDCCH candidate C). In some embodiments, the third set of PDCCH candidates (or PDCCH candidate C) may be configured in a third search space set S3. In some embodiments, the third search space set S3 may be associated with a third CORESET C3. In some embodiments, the third set of PDCCH candidates (or PDCCH candidate C) and/or the third search space set S3 and/or the third CORESET C3 are not associated with any other PDCCH candidates and/or any other search space set and/or any other CORESET. In some embodiments, the third set of PDCCH candidates (or PDCCH candidate C) and/or the third search space set S3 and/or the third CORESET C3 are not configured with the parameter R1 and/or not configured with the parameter R2.

In some embodiments, the first set of PDCCH candidates are different from the second set of PDCCH candidates. In some embodiments, PDCCH candidate A is different from PDCCH candidate B.

In some embodiments, at a terminal device, the DCI received in the PDCCH which is monitored on the first set of PDCCH candidates (or PDCCH candidate A) may be for scheduling a communication. In some embodiments, the communication may include communication of at least one of the following: a PDSCH reception, a SPS PDSCH release, a PUSCH, a PUCCH, a CSI-RS, an aperiodic CSI-RS, a Zero power (ZP) CSI-RS, an aperiodic ZP CSI-RS, a SRS, an aperiodic SRS, a CSI report, an aperiodic CSI report, a HARQ feedback (ACK or NACK), a power control information, a transmit power control (TPC) information and so on.

In some embodiments, a terminal device may provide HARQ-ACK information in a PUCCH transmission in response to detecting a DCI scheduling a PDSCH reception or a SPS PDSCH release, and the terminal device may determine the PUCCH resource with index $r_{PUCCH}$, and $r_{PUCCH}$ is a non-negative integer. For example, 0≤$r_{PUCCH}$≤15. In some embodiments, the detected DCI is received in a PDCCH on one of the first set of PDCCH candidates (or PDCCH candidate A). In some embodiments, the value of $r_{PUCCH}$ may be determined based on at least one of an index of a first CCE for one of the second set of PDCCH candidates (or PDCCH candidate B), a number of CCEs in the first CORESET (for example, CORSET C1 which is associated with the first search space, and the first set of PDCCH candidates (or PDCCH candidate A) is included in the first search space), a number of CCEs in the second CORESET (for example, CORSET C2 which is associated with the second search space, and the second set of PDCCH candidates (or PDCCH candidate B) is included in the second search space), a value of the PUCCH resource indicator field in the DCI.

In some embodiments, if the terminal device 120 provides HARQ-ACK information in a PUCCH transmission in response to detecting a DCI scheduling a PDSCH reception or a SPS PDSCH release, (for example, the DCI is in a PDCCH which is monitored in one of the first set of PDCCH candidates (or PDCCH candidate A)), the terminal device 120 may determine a PUCCH resource with index $r_{PUCCH}$, $0 \leq r_{PUCCH} \leq 15$, as $$r_{PUCCH} = \left\lfloor \frac{2 \cdot n_{CCE,r}}{N_{CCE,r}} \right\rfloor + 2 \cdot \Delta_{PRI},$$

where $n_{CCE,r}$ is the index of a first CCE for the second set of PDCCH candidates (or PDCCH candidate B), and $\Delta_{PRI}$ is a value of the PUCCH resource indicator field in the DCI. In some embodiments, $N_{CCE,r}$ is a number of CCEs in the first CORESET (for example, CORESET C1, which is associated with the first search space, and the first set of PDCCH candidates (or PDCCH candidate A) is included in the first search space). In some embodiments, $N_{CCE,r}$ is a number of CCEs in the second CORESET (for example, CORESET C2, which is associated with the second search space, and the second set of PDCCH candidates (or PDCCH candidate B) is included in the second search space).

In some embodiments, if the terminal device 120 provides HARQ-ACK information in a PUCCH transmission in response to detecting a DCI scheduling a PDSCH reception or a SPS PDSCH release. In some embodiments, if the DCI is in a PDCCH which is monitored in one of the first set of PDCCH candidates (or PDCCH candidate A), the terminal device 120 may determine a PUCCH resource with index $r_{PUCCH}$, $0 \leq r_{PUCCH} \leq 15$, as $$r_{PUCCH} = \left\lfloor \frac{2 \cdot n_{CCE,r}}{N_{CCE,r}} \right\rfloor + 2 \cdot \Delta_{PRI},$$

where $n_{CCE,r}$ is the index of a first CCE for the second set of PDCCH candidates (or PDCCH candidate B), and $\Delta_{PRI}$ is a value of the PUCCH resource indicator field in the DCI. And if the DCI is in a PDCCH which is monitored in one of the second and/or third set of PDCCH candidates (or PDCCH candidate B or PDCCH candidate C) or if the DCI is not in a PDCCH which is monitored in one of the first set of PDCCH candidates (or PDCCH candidate A), the terminal device 120 may determine a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of CCEs in a CORESET of the PDCCH reception with the DCI, $n_{CCE,0}$ is the index of a first CCE for the PDCCH reception, and $\Delta_{PRI}$ is a value of the PUCCH resource indicator field in the DCI. In some embodiments, $N_{CCE,r}$ is a number of CCEs in the second CORESET (for example, CORESET C2, which is associated with the second search space, and the second set of PDCCH candidates (or PDCCH candidate B) is included in the second search space).

In some embodiments, if the terminal device 120 provides HARQ-ACK information in a PUCCH transmission in response to detecting a DCI scheduling a PDSCH reception or a SPS PDSCH release, (for example, the DCI is in a PDCCH which is monitored in one of the first set of PDCCH candidates (or PDCCH candidate A)), the terminal device 120 may determine a PUCCH resource with index $r_{PUCCH}$, $0 \leq r_{PUCCH} \leq 15$, as any one of:

$$r_{PUCCH} = \left\lfloor \frac{2 \cdot (n_{CCE,0} + n_{offset})}{N_{CCE}} \right\rfloor + 2 \cdot \Delta_{PRI},$$

$$r_{PUCCH} = \left\lfloor \frac{2 \cdot ((n_{CCE,0} + n_{offset}) \bmod N_{CCE})}{N_{CCE}} \right\rfloor + 2 \cdot \Delta_{PRI},$$

$$r_{PUCCH} = \left\lfloor \frac{(2 \cdot (n_{CCE,0} + n_{offset})) \bmod (2 \cdot N_{CCE})}{N_{CCE}} \right\rfloor + 2 \cdot \Delta_{PRI},$$

$$r_{PUCCH} = \left\lfloor \frac{2 \cdot n_{CCE,0} + n_{offset}}{N_{CCE}} \right\rfloor + 2 \cdot \Delta_{PRI},$$

$$r_{PUCCH} = \left\lfloor \frac{(2 \cdot n_{CCE,0} + n_{offset}) \bmod (2 \cdot N_{CCE})}{N_{CCE}} \right\rfloor + 2 \cdot \Delta_{PRI},$$

$$r_{PUCCH} = \left( \left\lfloor \frac{2 \cdot n_{CCE,0}}{N_{CCE}} \right\rfloor + n_{offset} \right) \bmod 2 + 2 \cdot \Delta_{PRI},$$

where $N_{CCE}$ is a number of CCEs in a CORESET of the PDCCH reception with the DCI, $n_{CCE,0}$ is the index of a first CCE for the PDCCH reception, and $\Delta_{PRI}$ is a value of the PUCCH resource indicator field in the DCI.

In some embodiments, if the terminal device 120 provides HARQ-ACK information in a PUCCH transmission in response to detecting a DCI scheduling a PDSCH reception or a SPS PDSCH release. In some embodiments, if the DCI is in a PDCCH which is monitored in one of the first set of PDCCH candidates (or PDCCH candidate A), the terminal device 120 may determine a PUCCH resource with index $r_{PUCCH}$, $0 \leq r_{PUCCH} \leq 15$, as any one of:

$$r_{PUCCH} = \left\lfloor \frac{2 \cdot (n_{CCE,0} + n_{offset})}{N_{CCE}} \right\rfloor + 2 \cdot \Delta_{PRI},$$

$$r_{PUCCH} = \left\lfloor \frac{2 \cdot ((n_{CCE,0} + n_{offset}) \bmod N_{CCE})}{N_{CCE}} \right\rfloor + 2 \cdot \Delta_{PRI},$$

$$r_{PUCCH} = \left\lfloor \frac{(2 \cdot (n_{CCE,0} + n_{offset})) \bmod (2 \cdot N_{CCE})}{N_{CCE}} \right\rfloor + 2 \cdot \Delta_{PRI},$$

$$r_{PUCCH} = \left\lfloor \frac{2 \cdot n_{CCE,0} + n_{offset}}{N_{CCE}} \right\rfloor + 2 \cdot \Delta_{PRI},$$

$$r_{PUCCH} = \left\lfloor \frac{(2 \cdot n_{CCE,0} + n_{offset}) \bmod (2 \cdot N_{CCE})}{N_{CCE}} \right\rfloor + 2 \cdot \Delta_{PRI},$$

$$r_{pUCCH} = \left( \left\lfloor \frac{2 \cdot n_{CCE,0}}{N_{CCE}} \right\rfloor + n_{offset} \right) \bmod 2 + 2 \cdot \Delta_{PRI},$$

where $N_{CCE}$ is a number of CCEs in a CORESET of the PDCCH reception with the DCI, $n_{CCE,0}$ is the index of a first CCE for the PDCCH reception, and $\Delta_{PRI}$ is a value of the PUCCH resource indicator field in the DCI. And if the DCI is in a PDCCH which is monitored in one of the second and/or third set of PDCCH candidates (or PDCCH candidate B or PDCCH candidate C) or if the DCI is not in a PDCCH which is monitored in one of the first set of PDCCH candidates (or PDCCH candidate A), the terminal device 120 may determine a PUCCH resource with index $r_{PUCCH}$, $0 \le r_{PUCCH} \le 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of CCEs in a CORESET of the PDCCH reception with the DCI, $n_{CCE,0}$ is the index of a first CCE for the PDCCH reception, and $\Delta_{PRI}$ is a value of the PUCCH resource indicator field in the DCI.

In some embodiments, the value of $n_{offset}$ is a non-negative integer. For example, $0 \le n_{offset} \le N_{CCE}$. For another example, $0 \le n_{offset} \le 1$.

In some embodiments, a terminal device may be configured with M PDCCH candidates corresponding to an aggregation level (For example, L. L is positive integer. For example, L may be at least one of {1, 2, 4, 8, 16}) in a search space set (For example, S. S is non-negative integer. For example, $0 \le S \le 39$. For another example, $0 < S < 40$.), and M is positive integer. For example, $1 \le M \le 8$. For example, one PDCCH candidate in the M PDCCH candidates may be indexed with $m_s$, and $m_s$ is a non-negative integer. For example, $m_s \in (0, 1, \ldots M-1)$. In some embodiments, the PDCCH candidate with index $m_s$ and the PDCCH candidate with index $(m_s+K)$ mod M may be associated and/or linked with each other. In some embodiments, the DCI in the PDCCH on PDCCH candidate with index $m_s$ and the DCI in the PDCCH on the PDCCH candidate with index $m_s+K)$ mod M may be may be for scheduling a same communication. In some embodiments, the communication may include communication of at least one of the following: a PDSCH reception, a SPS PDSCH release, a PUSCH, a PUCCH, a CSI-RS, an aperiodic CSI-RS, a Zero power (ZP) CSI-RS, an aperiodic ZP CSI-RS, a SRS, an aperiodic SRS, a CSI report, an aperiodic CSI report, a HARQ feedback (ACK or NACK), a power control information, a transmit power control (TPC) information and so on.

In some embodiments, K is a non-negative integer. For example, $K \in (0, 1, \ldots M-1)$. In some embodiments, K may be configured by at least one of RRC, MAC CE and DCI. In some embodiments, K may be ceil((M−1)/2) or floor((M−1)/2). In some embodiments, K may be 1 or 2.

In some embodiments, if the value of M is an even integer or if M mod2=0, the PDCCH candidate with index $m_s$ and the PDCCH candidate with index $(m_s+K)$ mod M may be associated and/or linked with each other. In some embodiments, the DCI in the PDCCH on PDCCH candidate with index $m_s$ and the DCI in the PDCCH on the PDCCH candidate with index $(m_s+K)$ mod M may be may be for scheduling a same communication.

In some embodiments, if the value of M is an odd integer or if M mod2 =1 or if M mod2≠0, the PDCCH candidate with index $m_s$ ($m_s \in (0, 1, \ldots M-2)$) and the PDCCH candidate with index $(m_s+K)$ mod M may be associated and/or linked with each other. In some embodiments, the DCI in the PDCCH on PDCCH candidate with index $m_s \in (0, 1, \ldots M-2)$ and the DCI in the PDCCH on the PDCCH candidate with index $(m_s+K)$ mod M may be may be for scheduling a same communication. In some embodiments, K is a non-negative integer, and K may be (M−2)/2. In some embodiments, K may be 1 or 2. In some embodiments, the PDCCH candidate with index $m_s=M-1$ may not be associated with another PDCCH candidate.

FIG. 11 is a simplified block diagram of a device 1100 that is suitable for implementing embodiments of the present disclosure. The device 1100 can be considered as a further example implementation of the terminal device 120, or the network device 110, as shown in FIG. 1. Accordingly, the device 1100 can be implemented at or as at least a part of the terminal device 120, or the network device 110.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a mobility management entity (MME)/serving gateway (S-GW) and the eNB, Uu interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 2-10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1110 may form processing means 1150 adapted to implement various embodiments of the present disclosure.

The memory 1110 may be of any type suitable to the local technical network and may be implemented using any suitable data storage technology, such as a non-transitory computer-readable storage medium, semiconductor-based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer-readable storage medium. The computer program product includes computer-executable instructions, such as those included in program modules, being executed in a device on a target real or virtual processor, to carry out the process or method as described above with reference to FIGS. 2-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:

detecting a downlink control information (DCI) format in a physical downlink control channel (PDCCH) reception, wherein:

the PDCCH reception includes a first PDCCH candidate and a second PDCCH candidate, the first PDCCH candidate is from a first search space set and the second PDCCH candidate is from a second search space set, and the first PDCCH candidate and the second PDCCH candidate correspond to the DCI format with same information; and determining a Physical Uplink Control Channel (PUCCH) resource for transmitting Hybrid automatic repeat request acknowledgement (HARQ-ACK) information in a case where the DCI format is detected, based on an index of a first control channel element (CCE) associated with either one of the first search space set or the second search space set.

2. The method of claim 1, wherein the PUCCH resource is determined further based on a number of CCEs in a Control Resource Set (CORESET) associated with the one of the first search space set or the second search space set.

3. The method of claim 1, wherein the PUCCH resource is determined further based on a parameter that is used to link the first search space set and the second search space set.

4. The method of claim 1, wherein the PUCCH resource is determined further based on a value of a PUCCH resource indicator field in the DCI format.

5. The method of claim 2, wherein the first CCE is a CCE with a lowest value of CCE index in a set of CCEs in the CORESET associated with the one of the first search space set or the second search space set.

6. A method performed by a network device, the method comprising:

performing a physical downlink control channel (PDCCH) transmission with a downlink control information (DCI) format, wherein:

the PDCCH transmission includes a first PDCCH candidate and a second PDCCH candidate, the first PDCCH candidate is from a first search space set and the second PDCCH candidate is from a second search space set, the first PDCCH candidate and the second PDCCH candidate correspond to the DCI format with same information, and a Physical Uplink Control Channel (PUCCH) resource for Hybrid automatic repeat request acknowledgement (HARQ-ACK) information is determined based on an index of a first control channel element (CCE) associated with either one of the first search space set or the second search space set in a case where the DCI format is detected by a terminal device; and receiving the HARQ-ACK information from the terminal device.

7. The method of claim 6, wherein the PUCCH resource is determined further based on a number of CCEs in a Control Resource Set (CORESET) associated with the one of the first search space set or the second search space set.

8. The method of claim 6, wherein the PUCCH resource is determined further based on a parameter that is used to link the first search space set and the second search space set.

9. The method of claim 6, wherein the PUCCH resource is determined further based on a value of a PUCCH resource indicator field in the DCI.

10. The method of claim 7, wherein the first CCE is a CCE with a lowest value of CCE index in a set of CCEs in the CORESET associated with the one of the first search space set or the second search space set.

11. A terminal device, comprising:
a processor configured to cause the terminal device to:
  detect a downlink control information (DCI) format in a physical downlink control channel (PDCCH) reception, wherein:
    the PDCCH reception includes a first PDCCH candidate and a second PDCCH candidate,
    the first PDCCH candidate is from a first search space set and the second PDCCH candidate is from a second search space set, and the first PDCCH candidate and the second PDCCH candidate correspond to the DCI format with same information; and
  determine a Physical Uplink Control Channel (PUCCH) resource for transmitting Hybrid automatic repeat request acknowledgement (HARQ-ACK) information in a case where the DCI format is detected, based on an index of a first control channel element (CCE) associated with either one of the first search space set or the second search space set.

12. The terminal device of claim 11, wherein the PUCCH resource is determined further based on a number of CCEs in a Control Resource Set (CORESET) associated with the one of the first search space set or the second search space set.

13. The terminal device of claim 11, wherein the PUCCH resource is determined further based on a parameter that is used to link the first search space set and the second search space set.

14. The terminal device of claim 11, wherein the PUCCH resource is determined further based on a value of a PUCCH resource indicator field in the DCI.

15. The terminal device of claim 12, wherein the first CCE is a CCE with a lowest value of CCE index in a set of CCEs in the CORESET associated with the one of the first search space set or the second search space set.

* * * * *